US008803858B2

(12) United States Patent
Noguchi et al.

(10) Patent No.: US 8,803,858 B2
(45) Date of Patent: Aug. 12, 2014

(54) DISPLAY DEVICE

(75) Inventors: Koji Noguchi, Kanagawa (JP); Eiji Sakai, Kanagawa (JP); Masanobu Ikeda, Aichi (JP); Koji Ishizaki, Tokyo (JP)

(73) Assignee: Japan Display West Inc., Aichi (JP)

( * ) Notice: Subject to any disclaimer, the term of this patent is extended or adjusted under 35 U.S.C. 154(b) by 65 days.

(21) Appl. No.: 13/211,477

(22) Filed: Aug. 17, 2011

(65) Prior Publication Data

US 2012/0050237 A1 Mar. 1, 2012

(30) Foreign Application Priority Data

Aug. 24, 2010 (JP) ................................. 2010-187176

(51) Int. Cl.
*G06F 3/038* (2013.01)
*G09G 5/00* (2006.01)
*G09G 3/36* (2006.01)

(52) U.S. Cl.
USPC ............................................ 345/204; 345/87

(58) Field of Classification Search
None
See application file for complete search history.

(56) References Cited

U.S. PATENT DOCUMENTS

| 7,656,489 B2 | 2/2010 | Suwa | |
| 8,149,363 B2* | 4/2012 | Hashimoto et al. | 349/129 |
| 2004/0125296 A1* | 7/2004 | Sasabayashi | 349/129 |
| 2005/0162084 A1* | 7/2005 | Park | 313/582 |
| 2008/0225217 A1* | 9/2008 | Wakabayashi | 349/144 |
| 2009/0091526 A1* | 4/2009 | Hirota | 345/96 |
| 2009/0147189 A1* | 6/2009 | Kim et al. | 349/106 |
| 2009/0256818 A1 | 10/2009 | Noguchi et al. | |

FOREIGN PATENT DOCUMENTS

| JP | 2001-311951 | 11/2001 |
| JP | 2008-129193 | 6/2008 |
| JP | 2009-258182 | 11/2009 |
| TW | 200732791 A | 9/2007 |

OTHER PUBLICATIONS

Japanese Office Action issued in connection to related Japanese Patent Application No. 2010-187176 dated Sep. 3, 2013.

Taiwanese Office Action issued in connection with related Taiwanese Patent Application No. 100124059 dated Dec. 17, 2013.

* cited by examiner

*Primary Examiner* — Alexander Eisen
*Assistant Examiner* — Nan-Ying Yang
(74) *Attorney, Agent, or Firm* — Dentons US LLP

(57) ABSTRACT

A display device includes: a plurality of drive electrodes extending in a first direction and arranged side-by-side in a second direction with an inter-electrode slit in between; and a plurality of pixel electrodes arranged in matrix in the first and second directions. Each of the drive electrodes has one or more inner-electrode slits, and a center of the pixel electrode is located in the inter-electrode slit or in the inner-electrode slit.

12 Claims, 21 Drawing Sheets

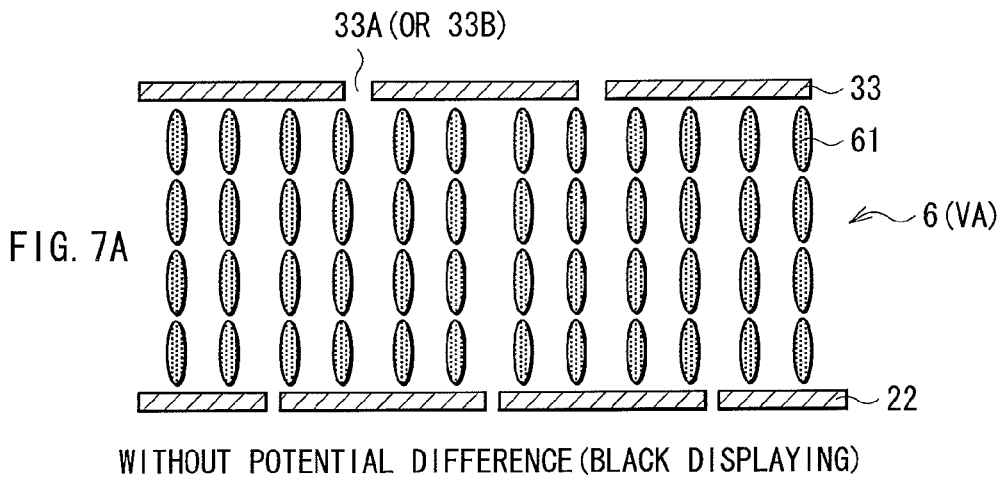
WITHOUT POTENTIAL DIFFERENCE (BLACK DISPLAYING)
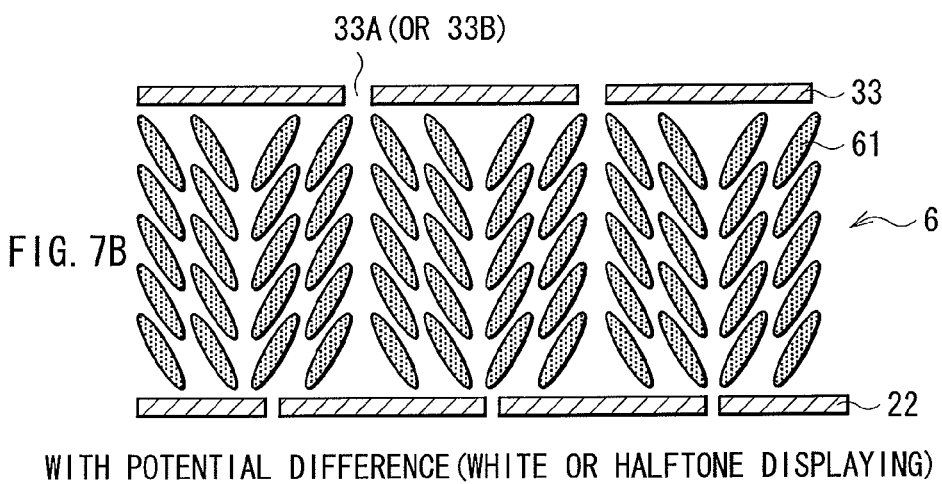
WITH POTENTIAL DIFFERENCE (WHITE OR HALFTONE DISPLAYING)
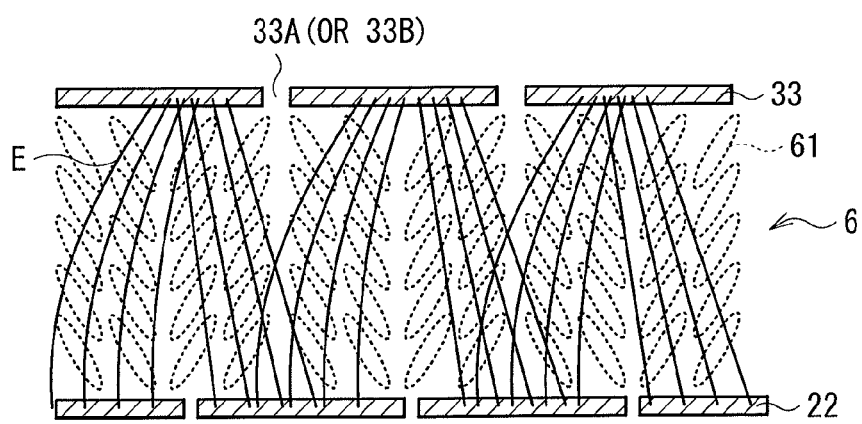
FIG. 8

DISPLAY DEVICE

ABOUT 20 cm

SURFACE LUMINANCE: 300cd/m²

| SLIT PITCH (μm) | RECOGNITION OF STREAK | REMARKS |
|---|---|---|
| 1000 | × | CLEARLY RECOGNIZABLE |
| 900 | × | CLEARLY RECOGNIZABLE |
| 800 | × | CLEARLY RECOGNIZABLE |
| 700 | × | CLEARLY RECOGNIZABLE |
| 600 | × | CLEARLY RECOGNIZABLE |
| 500 | △ | RECOGNIZABLE AT 20 cm OR LESS |
| 400 | △ | RECOGNIZABLE AT 20 cm OR LESS |
| 300 | ○ | NOT RECOGNIZABLE |
| 200 | ○ | NOT RECOGNIZABLE |
| 100 | ○ | NOT RECOGNIZABLE |
| 50 | ○ | NOT RECOGNIZABLE |

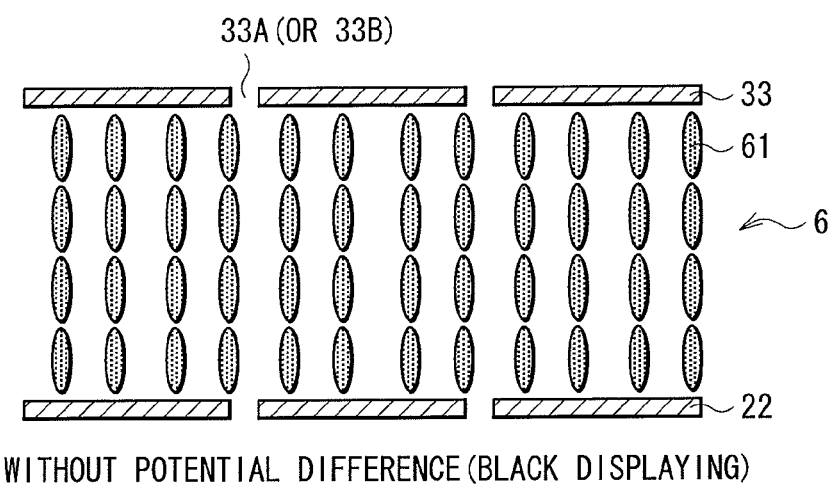
FIG. 24A  WITHOUT POTENTIAL DIFFERENCE (BLACK DISPLAYING)
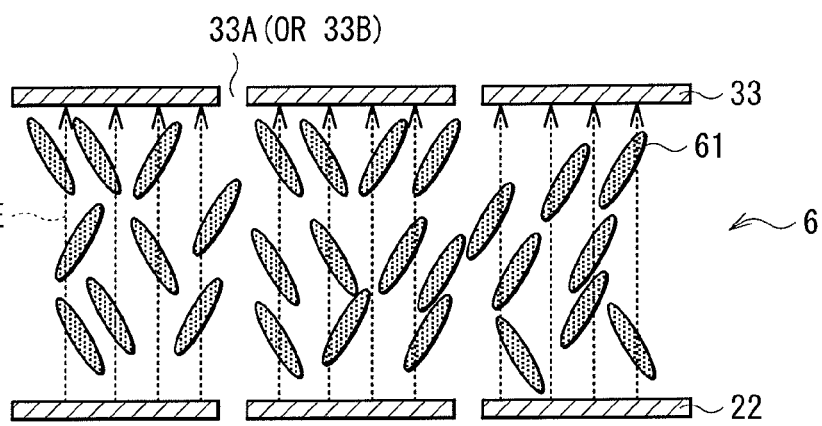
FIG. 24B  WITH POTENTIAL DIFFERENCE (WHITE OR HALFTONE DISPLAYING)

DISPLAY DEVICE

BACKGROUND

This disclosure relates to a display device suitable for a liquid crystal display of a vertical alignment (VA) mode, especially of a multi-domain vertical alignment (MVA) mode.

A liquid crystal display of a vertical alignment (VA) mode, which utilizes vertical alignment type liquid crystals, has been used in recent years. For example, Japanese Unexamined Patent Application Publication No. 2008-129193 discloses a liquid crystal display of the VA mode having a configuration in which pixel electrodes and drive electrodes (common electrodes) are disposed to oppose each other with the VA liquid crystals in between, and slits are provided for both the pixel electrodes and the drive electrodes. In both of the pixel electrodes and the drive electrodes, the slits are provided in pixel unit. The slits provided in the drive electrodes are formed in a discontinuous fashion in a horizontal direction within a plane, and do not extend in the horizontal direction within the plane, for example.

SUMMARY

A configuration of drive electrodes may be contemplated which utilizes the plurality of drive electrodes that extend in a horizontal direction and that are divided in a vertical direction. However, a slit-like clearance is generated in the horizontal direction between the adjacent drive electrodes in the configuration which utilizes the plurality of drive electrodes that are divided as described above. Thus, states of orientation of liquid crystal molecules are disturbed due to a structural difference between a portion where the slit-like clearance is formed and a portion where the drive electrode is formed. As a result, a portion corresponding to the slit-like clearance may be seen as a streak-like display defect.

It is desirable to provide a display device capable of performing an efficient orientation control which is suitable for a liquid crystal display of a VA mode, and capable of suppressing deterioration in display quality in the VA mode liquid crystal display.

A display device according to an embodiment of the technology includes: a plurality of drive electrodes extending, in a first direction, with a length larger than that of an effective display region, and arranged side-by-side in a second direction with an inter-electrode slit in between, each of the drive electrodes being supplied with a drive signal; and a plurality of pixel electrodes arranged in matrix in the first and second directions to face the drive electrodes, each of the pixel electrodes being supplied with an image signal. The inter-electrode slit extends to pass through a center region of each of the pixel electrodes.

A display device according to another embodiment of the technology includes: a plurality of drive electrodes extending in a first direction and arranged side-by-side in a second direction with an inter-electrode slit in between; and a plurality of pixel electrodes arranged in matrix in the first and second directions. Each of the drive electrodes has one or more inner-electrode slits, and a center of the pixel electrode is located in the inter-electrode slit or in the inner-electrode slit.

In the display devices according to the embodiments of the technology, the inter-electrode slit extends to pass through the center region of each of the pixel electrodes (the center of the pixel electrode is located in the inter-electrode slit or in the inner-electrode slit). Thus, an efficient orientation control suitable for a liquid crystal display of a vertical alignment mode is possible, as compared with an example where a slit is disposed between the adjacent pixel electrodes.

Advantageously, each of the drive electrodes has a width in the second direction corresponding to a size in the second direction of the two or more pixel electrodes, and has one or more inner-electrode slits extending in the first direction at least within the effective display region, and each of the inner-electrode slit and the inter-electrode slit extends to pass through center regions of pixel electrodes which belong to a pixel line in the first direction.

In this embodiment, each of the drive electrodes has the one or more inner-electrode slits extending in the first direction at least within the effective display region, and the inter-electrode slit corresponding to the inner-electrode slit is formed between the two adjacent drive electrodes. Thus, a structural difference between a portion where the drive electrode is formed and a portion between the two adjacent drive electrodes is reduced.

According to the display devices of the embodiments of the technology, each of the inner-electrode slit and the inter-electrode slit extends to pass through center regions of pixel electrodes. Hence, it is possible to perform an efficient orientation control suitable for the VA mode liquid crystal display, as compared with an example where a slit is disposed between the adjacent pixel electrodes.

Also, each of the drive electrodes has the one or more inner-electrode slits extending in the first direction at least within the effective display region, in the embodiment where each of the drive electrodes has a width in the second direction corresponding to a size in the second direction of the two or more pixel electrodes. This makes it possible to reduce a structural difference between a portion where the drive electrode is formed and a portion between the two adjacent drive electrodes. Thus, it is possible to uniformize states of orientation of liquid crystal molecules throughout the entire display region when the display device is applied to the liquid crystal display of the VA mode. Hence, it is possible to suppress deterioration in display quality in the VA mode liquid crystal display.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

Figure 1:
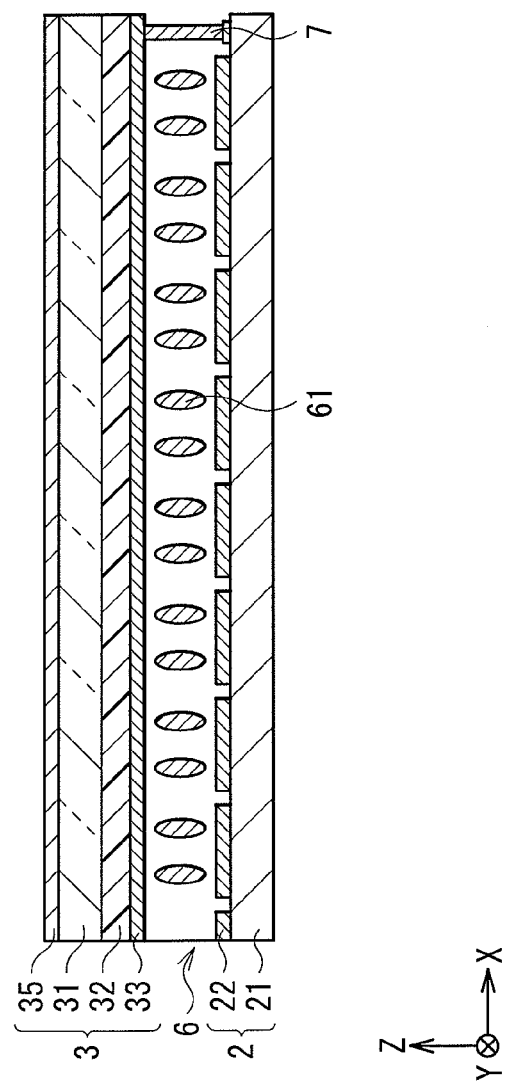
FIG. 1 is a cross-sectional view illustrating an exemplary configuration of a display device according to a first embodiment of the technology.
Figure 4:
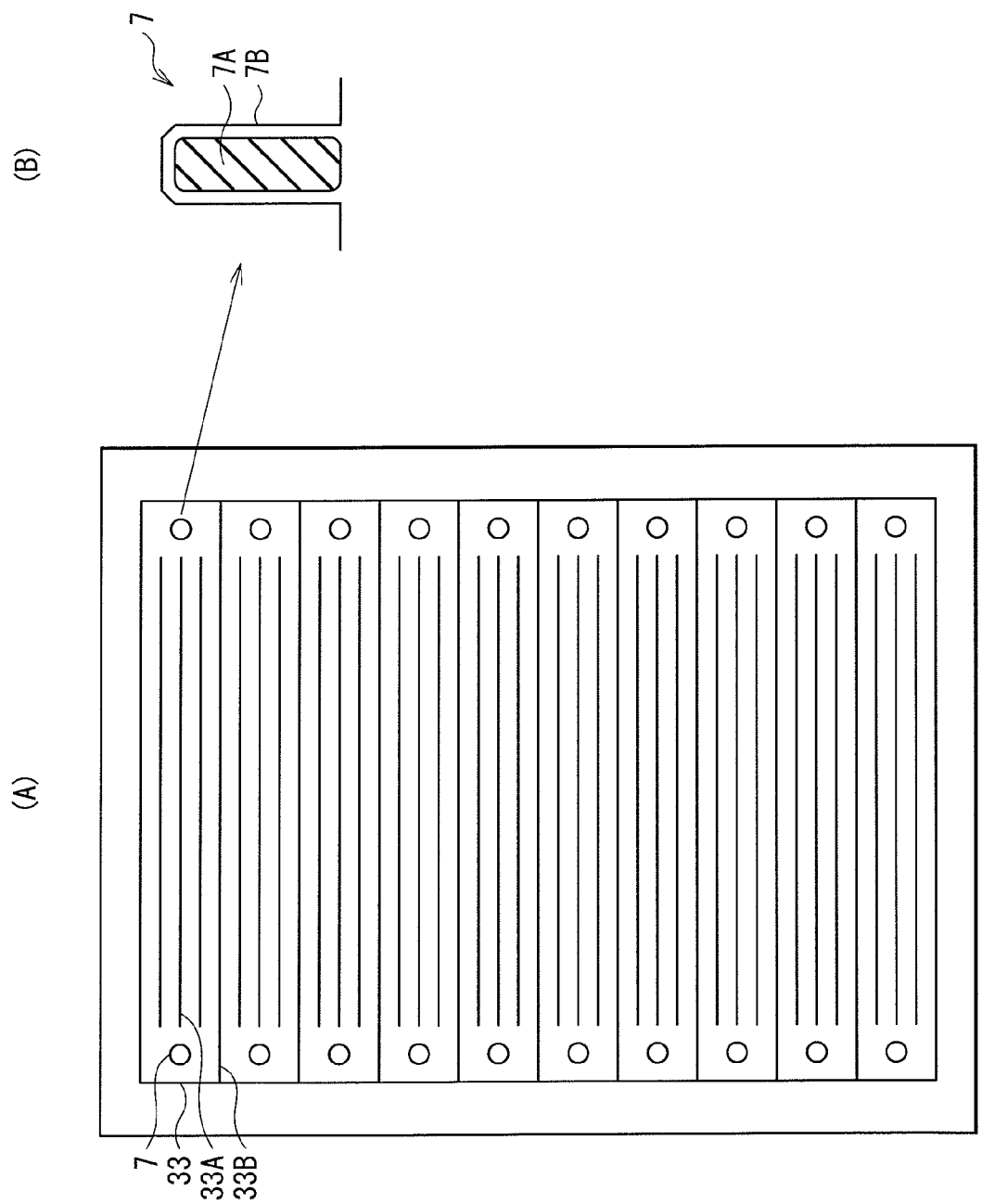

Part (A) of FIG. 4 is a plan view illustrating a connection structure of the drive electrodes and a pixel substrate in the display device illustrated in FIG. 1, and part (B) of FIG. 4 is a cross-sectional view illustrating a relevant part of a connection portion of the drive electrode and the pixel substrate.

Figure 5:
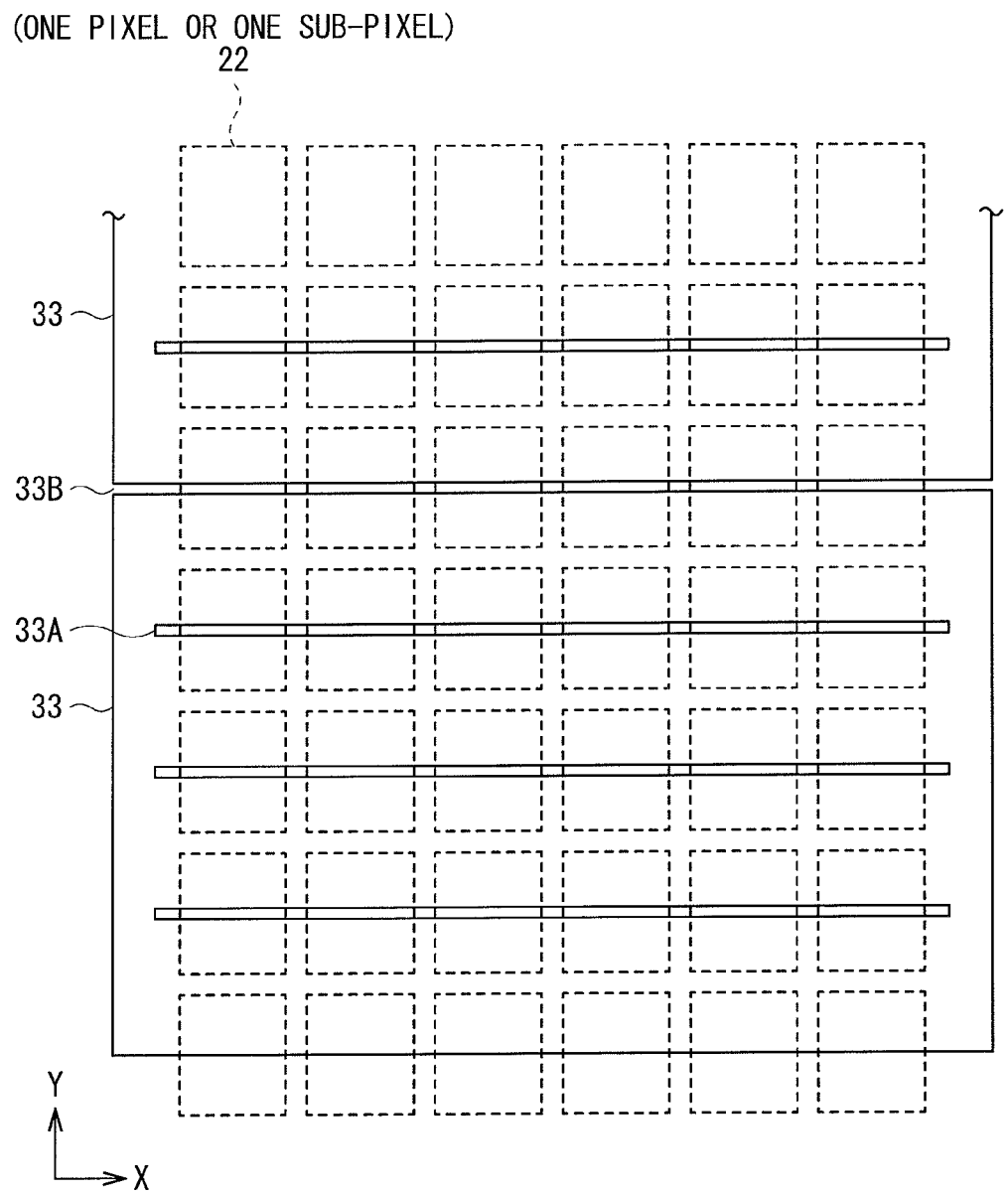

FIG. 5 is a plan view illustrating an example of a correspondence relationship between the drive electrodes and pixel electrodes in the display device illustrated in FIG. 1.

Figure 6:
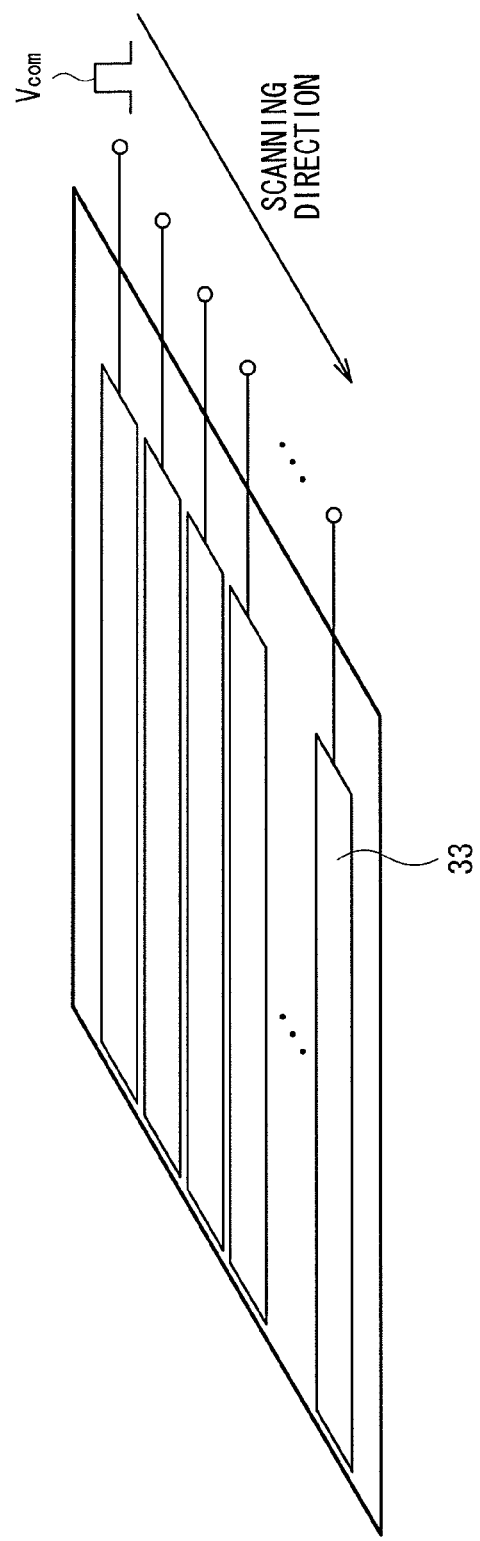

FIG. 6 is a perspective view illustrating the exemplary configuration of the drive electrodes in the display device illustrated in FIG. 1.

FIG. 7A is a cross-sectional view of a relevant part illustrating orientation states of liquid crystal molecules in a state when there is no potential difference between the pixel electrodes and the drive electrodes in the display device illustrated in FIG. 1, and FIG. 7B is a cross-sectional view of the relevant part illustrating the orientation states of the liquid crystal molecules in a state when there is a potential difference between the pixel electrodes and the drive electrodes in the display device illustrated in FIG. 1.

FIG. 8 is a cross-sectional view of a relevant part illustrating an example of lines of electric force between the pixel electrodes and the drive electrodes generated in the state illustrated in FIG. 7B.

Figure 9:
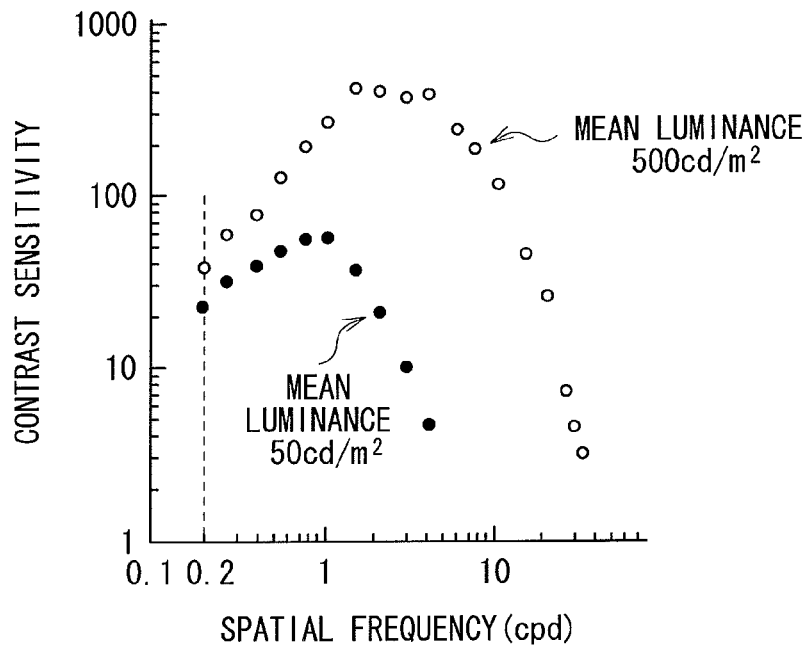

FIG. 9 is a characteristic diagram illustrating a human luminosity factor.

Figure 10:
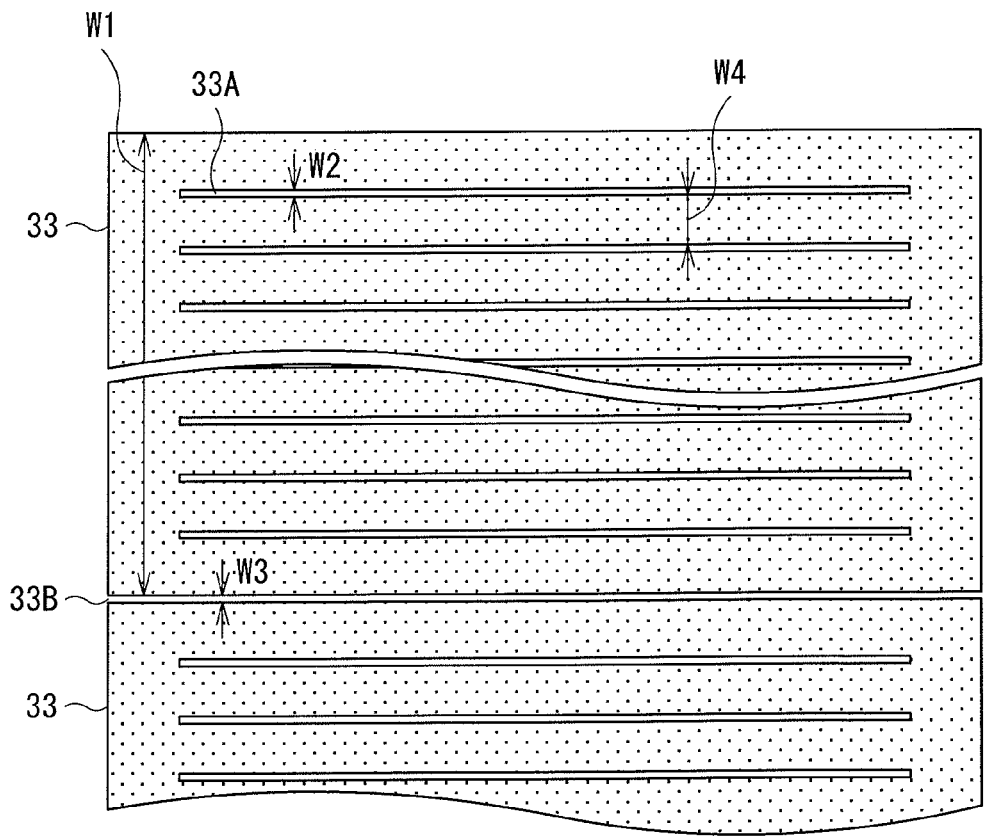

FIG. 10 is a plan view illustrating a specific design example of the drive electrodes in the display device illustrated in FIG. 1.

Figures 11, 12:
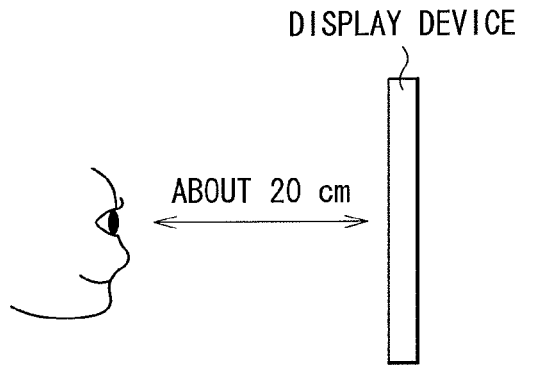

FIG. 11 describes a measurement environment of a specific example.

FIG. 12 describes a result of measurement on recognition of a slit when a pitch of the slit of a drive electrode is varied in the display device illustrated in FIG. 1.

Figure 13:
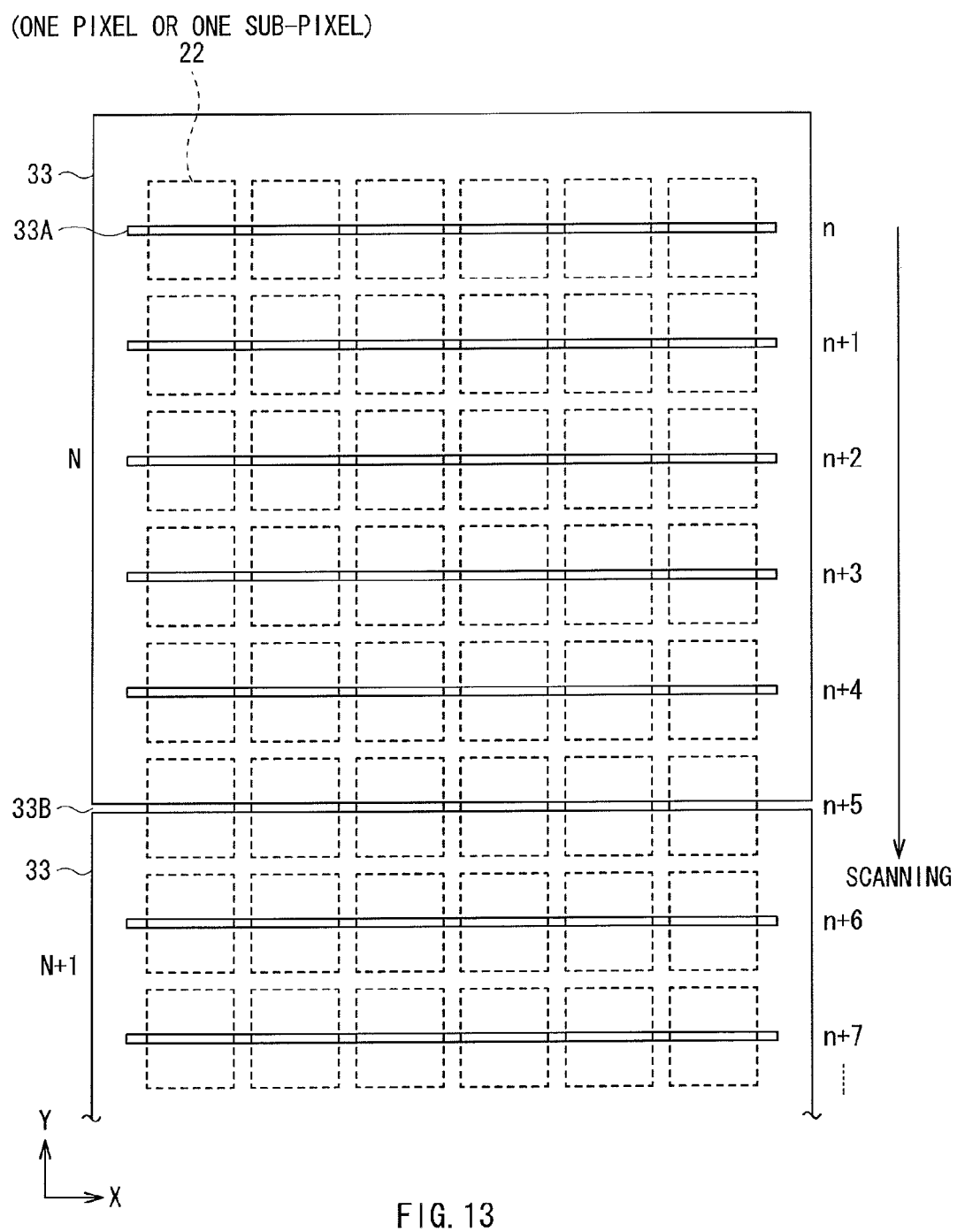

FIG. 13 is a plan view for describing a timing of applying signals between the drive electrodes and the pixel electrodes.

Figure 14:
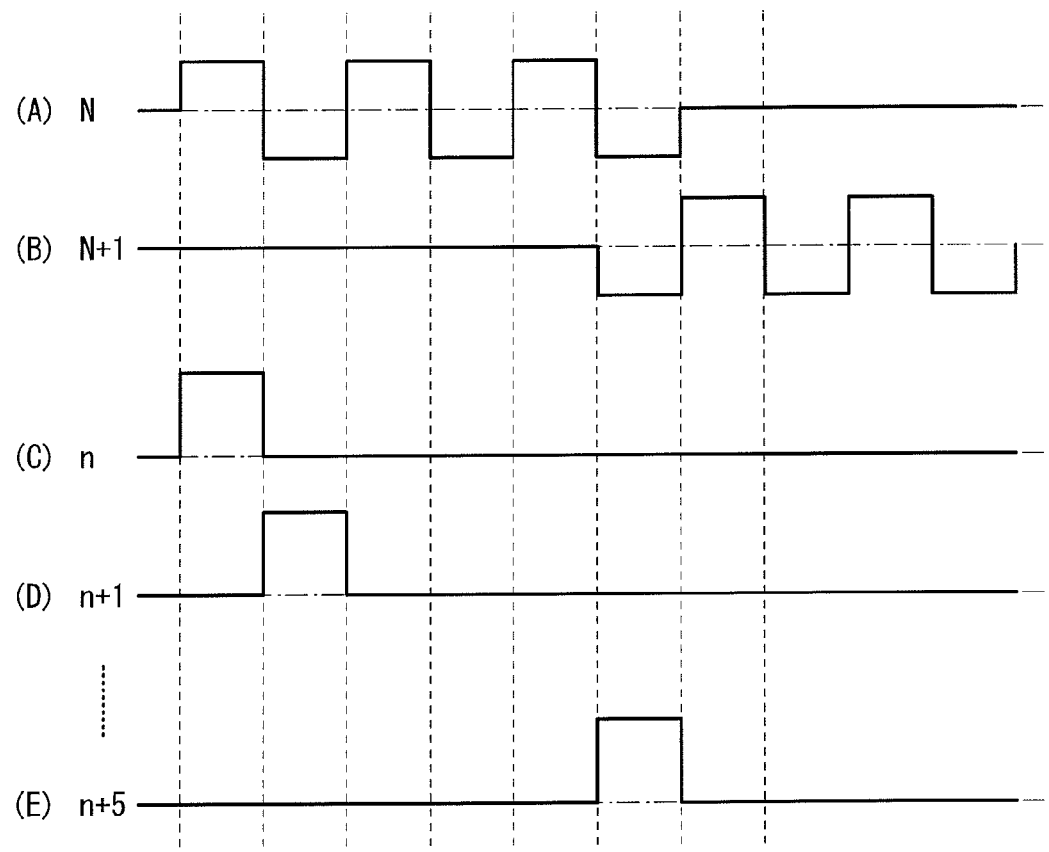

FIG. 14 is a timing chart in which (A) and (B) each illustrate a driving timing of the drive electrodes in the configuration illustrated in FIG. 13, and (C) to (E) each illustrate a scanning timing of the pixel electrodes.

Figure 15:
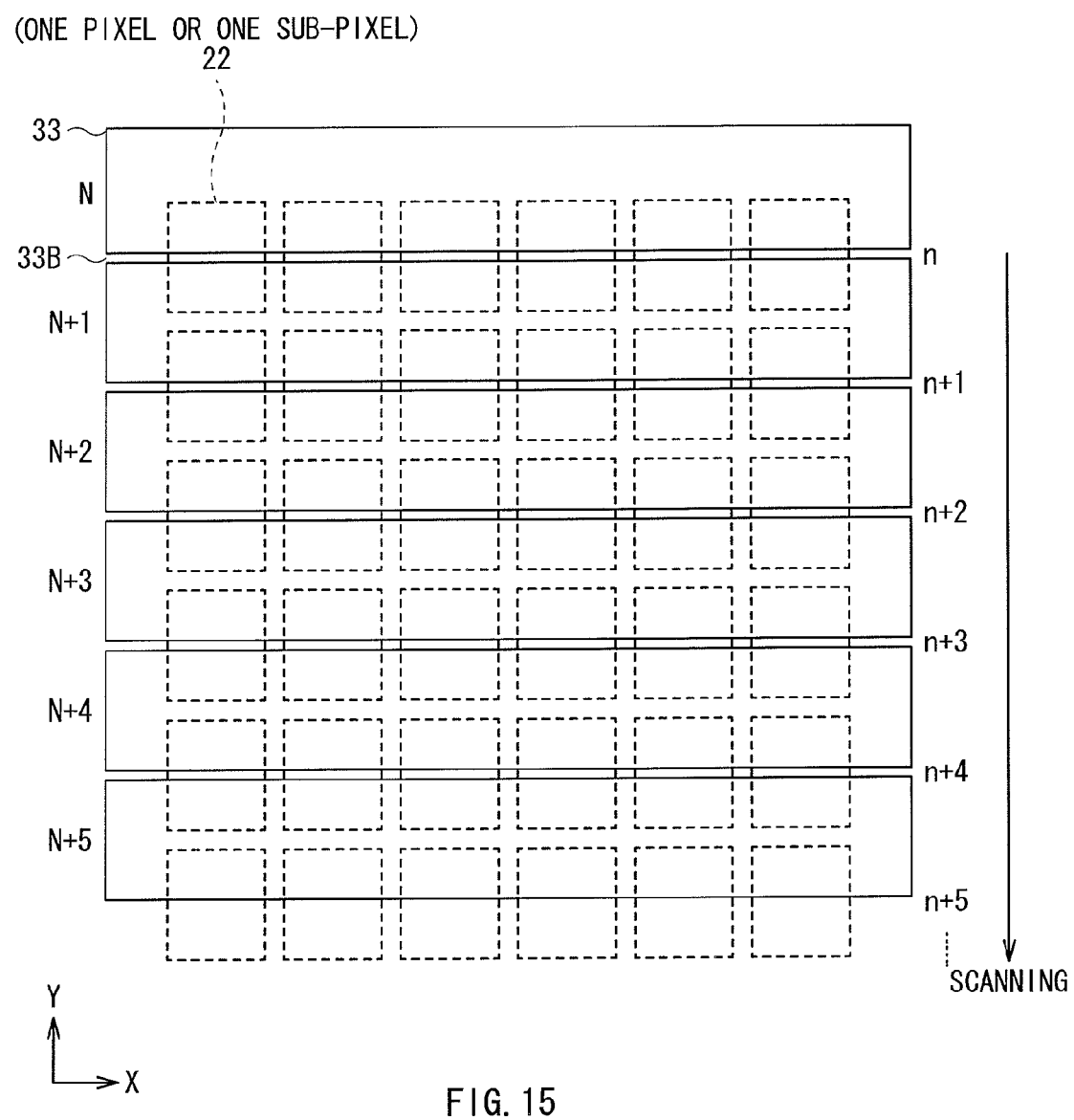

FIG. 15 is a plan view illustrating a configuration of drive electrodes in a display device according to a second embodiment of the technology.

Figure 16:
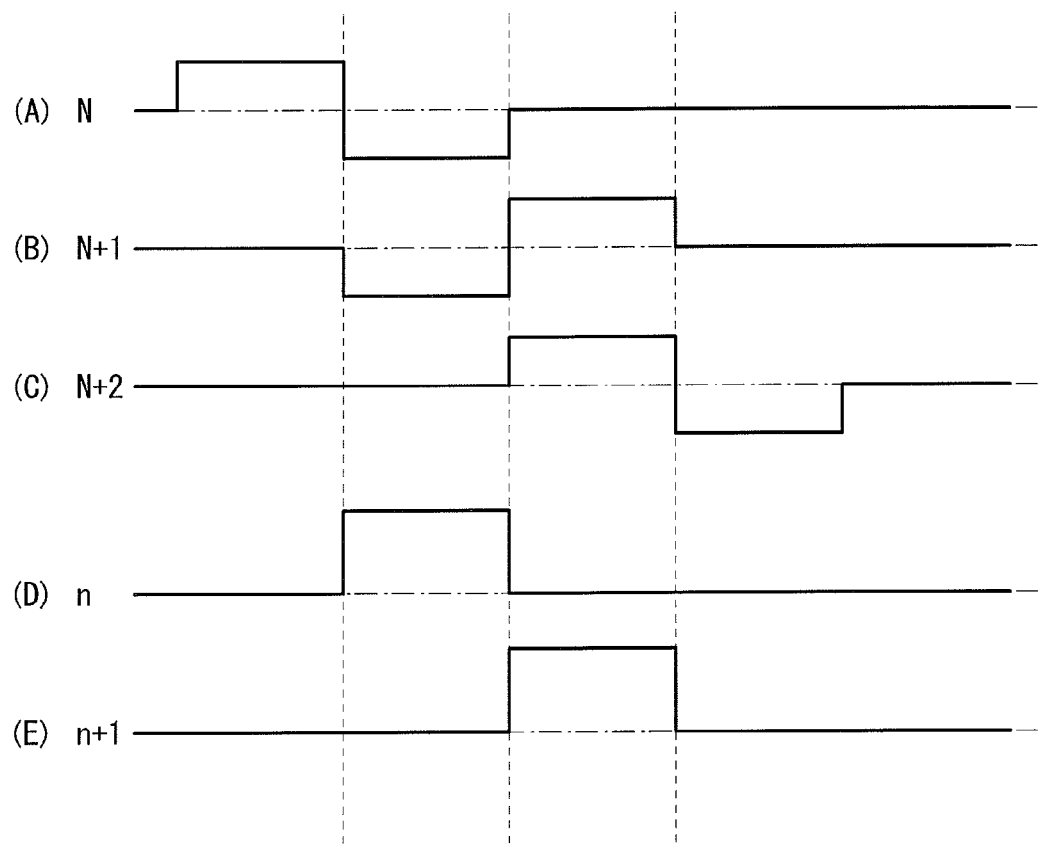

FIG. 16 is a timing chart in which (A) to (C) each illustrate a driving timing of the drive electrodes in the configuration illustrated in FIG. 15, and (D) and (E) each illustrate a scanning timing of the pixel electrodes.

Figure 17:
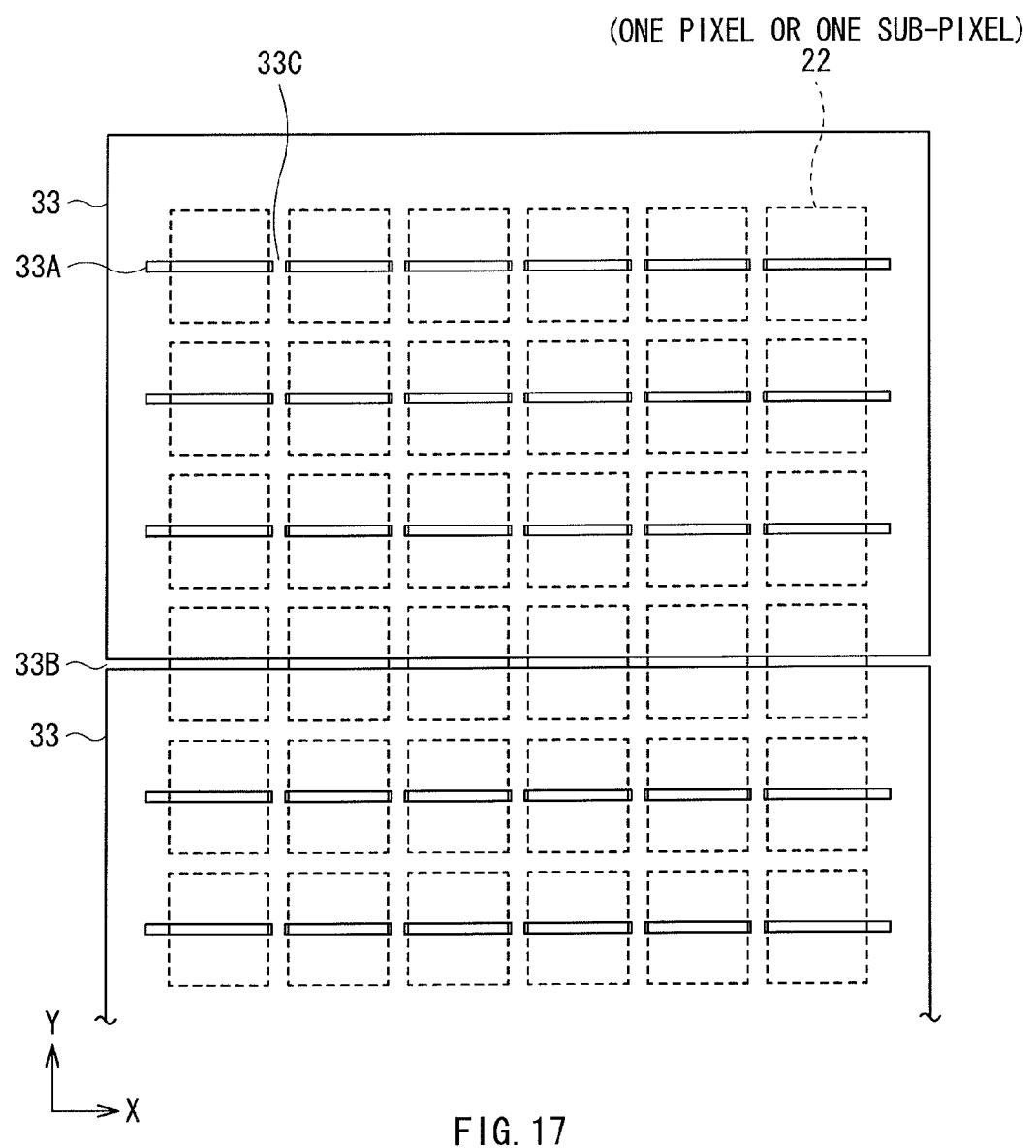

FIG. 17 is a plan view illustrating a configuration of drive electrodes in a display device according to a third embodiment of the technology.

Figure 18:
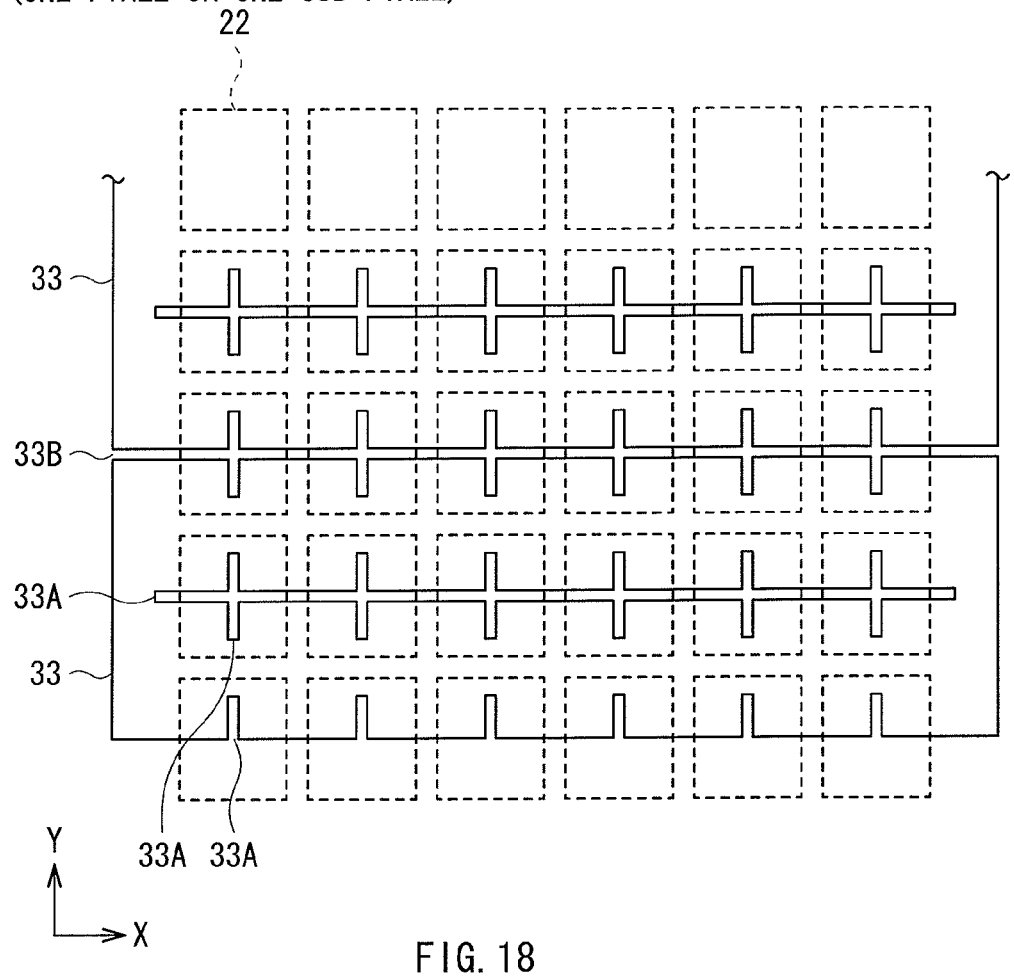

FIG. 18 is a plan view illustrating a configuration of drive electrodes in a display device according to a fourth embodiment of the technology.

Figure 19:
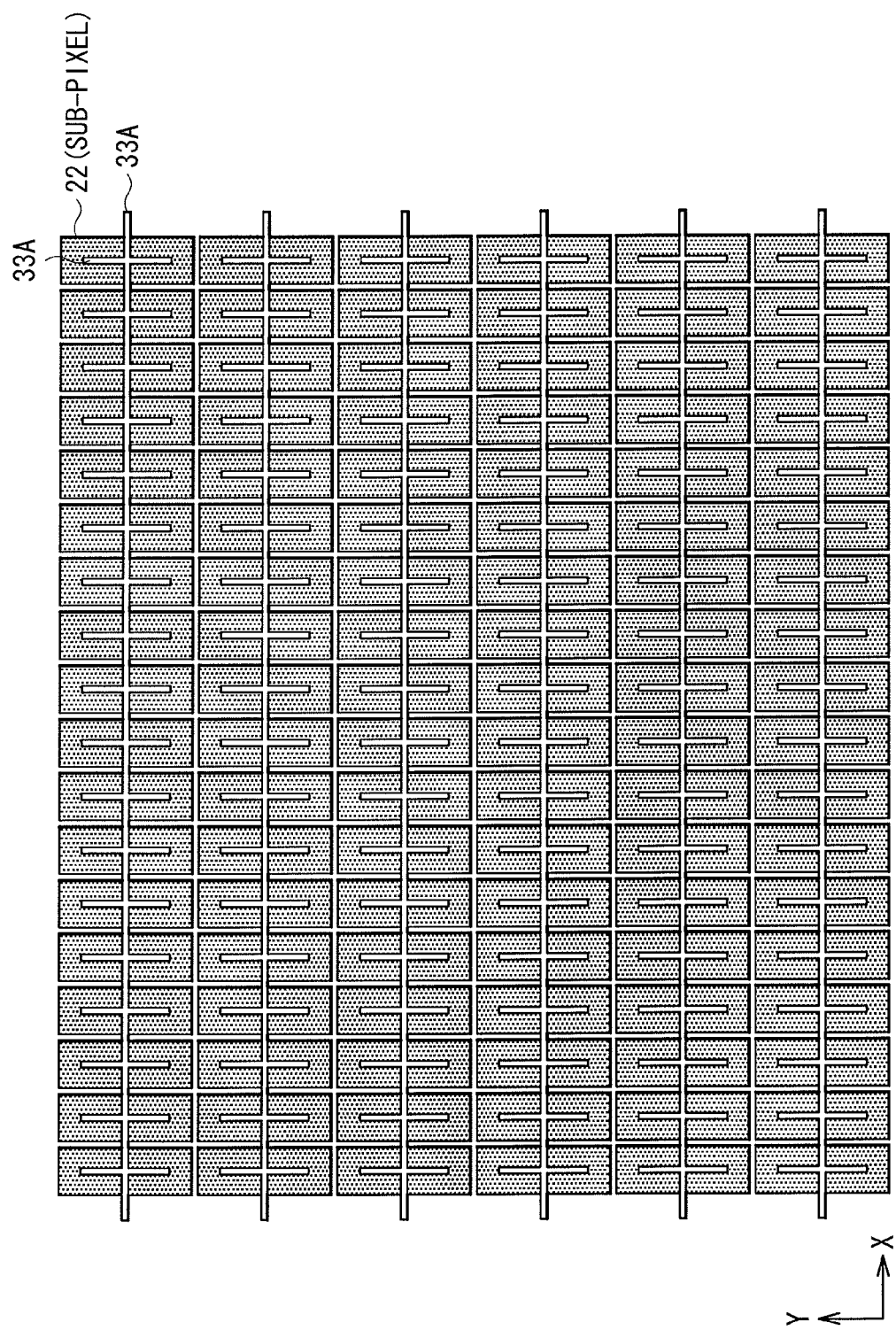

FIG. 19 is a plan view illustrating a configuration in sub-pixel unit of the drive electrodes and pixel electrodes in the display device according to the fourth embodiment.

Figure 20:
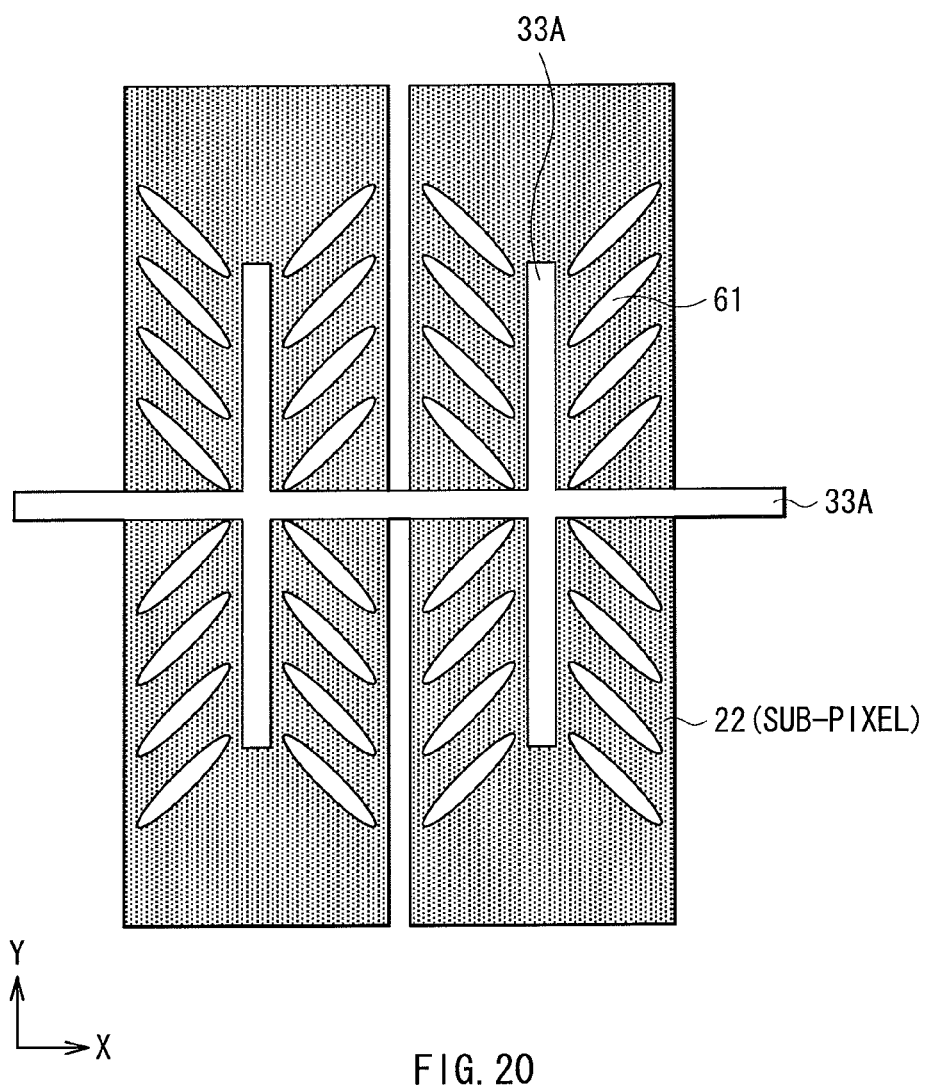

FIG. 20 is an enlarged plan view illustrating a relevant part of the drive electrodes and of the pixel electrodes illustrated in FIG. 19.

Figure 21:
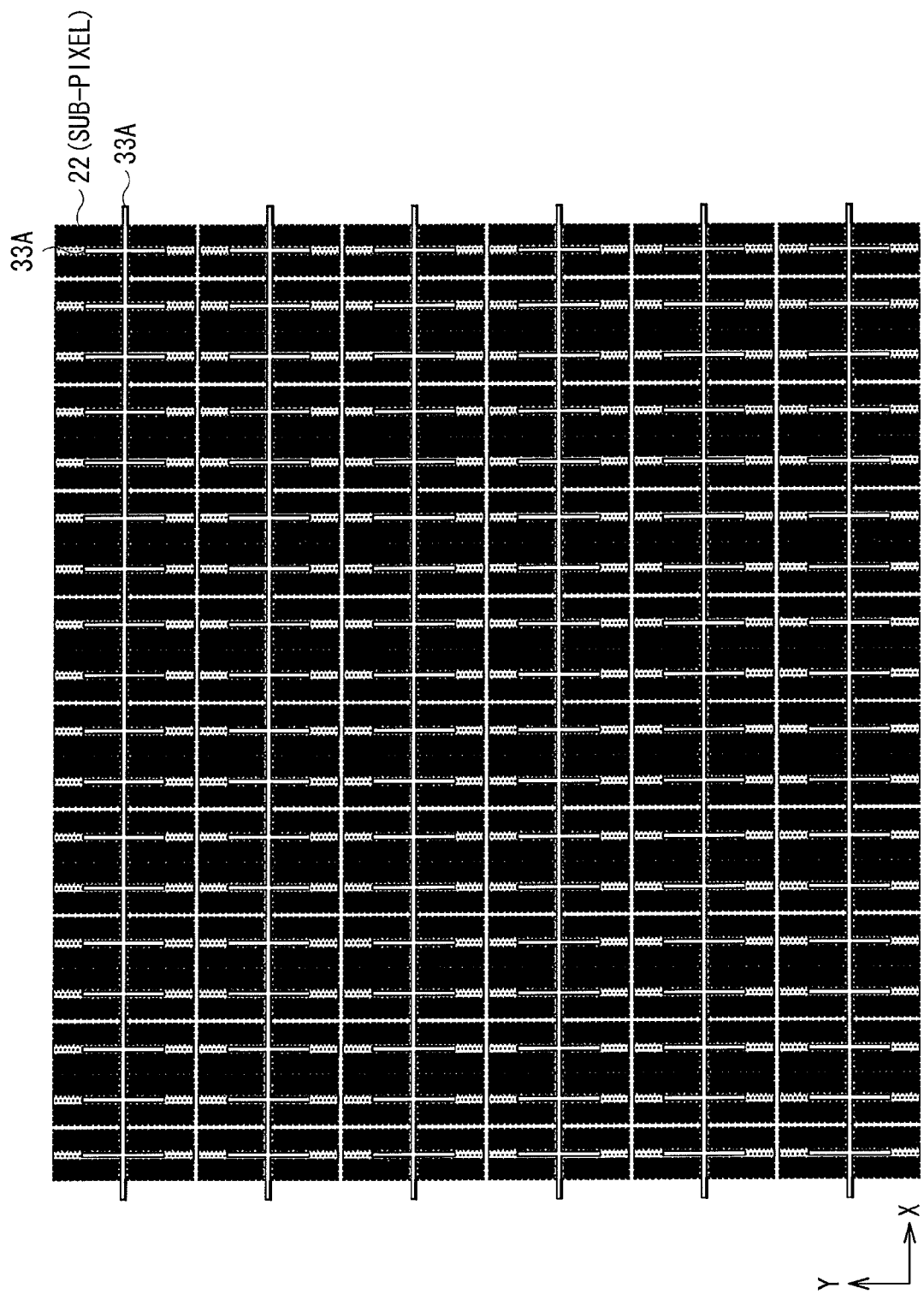

FIG. 21 is a plan view illustrating a configuration of drive electrodes and pixel electrodes in a display device according to a fifth embodiment of the technology.

Figure 22:
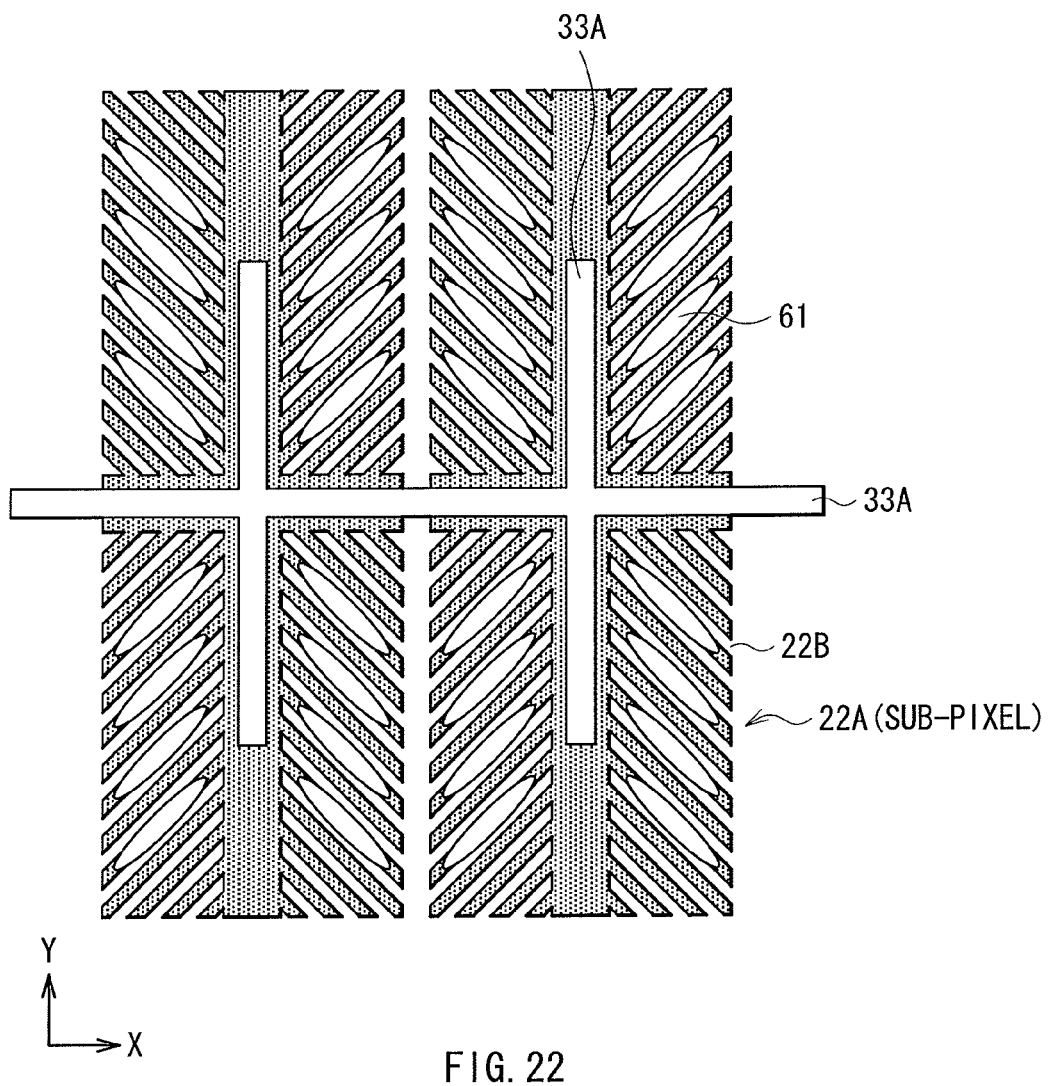

FIG. 22 is an enlarged plan view illustrating a relevant part of the drive electrodes and of the pixel electrodes illustrated in FIG. 21.

Figure 23:
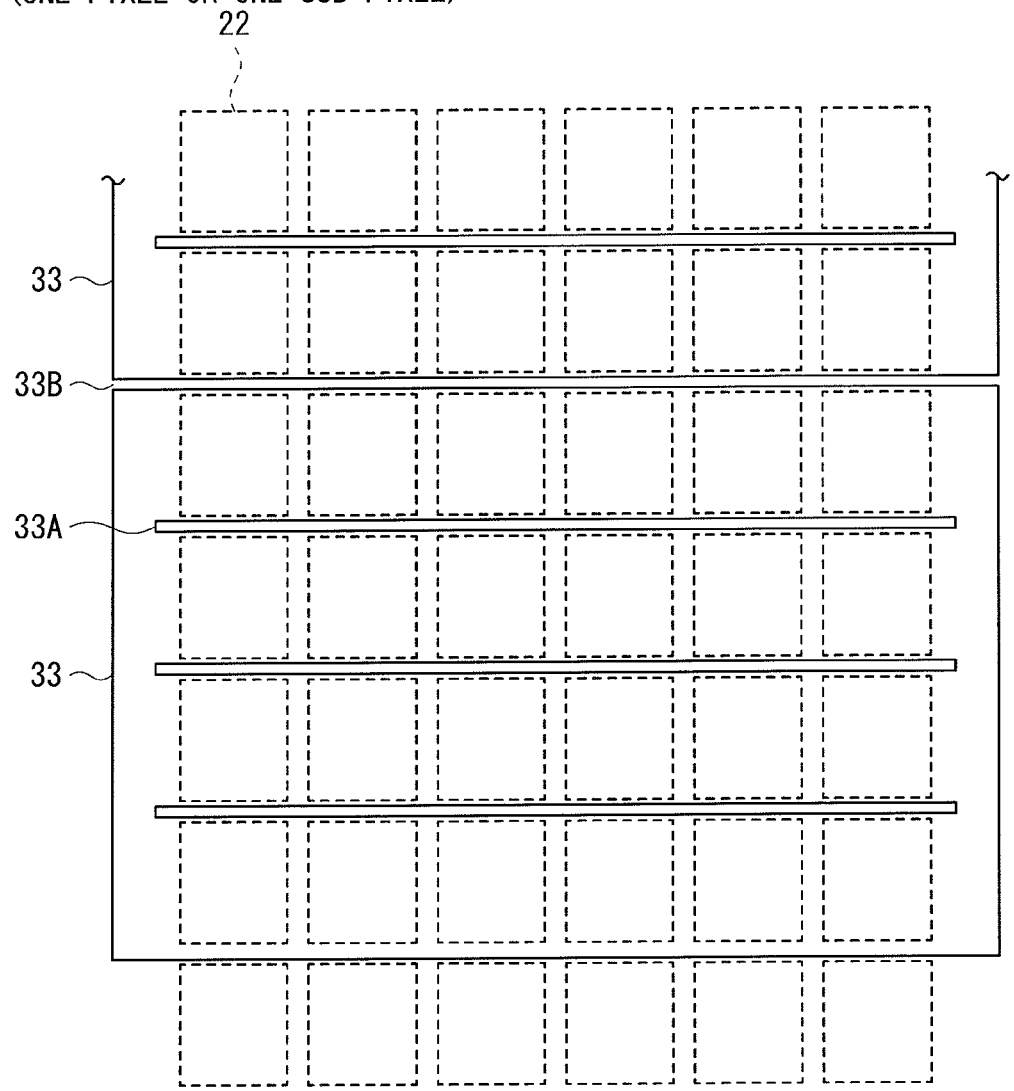

FIG. 23 is a plan view illustrating an exemplary configuration of drive electrodes in a display device according to a comparative example.

FIG. 24A is a cross-sectional view of a relevant part illustrating orientation states of liquid crystal molecules in a state when there is no potential difference between pixel electrodes and the drive electrodes in the configuration according to the comparative example illustrated in FIG. 23, and FIG. 24B is a cross-sectional view of the relevant part illustrating the orientation states of the liquid crystal molecules in a state when there is a potential difference between the pixel electrodes and the drive electrodes in the configuration according to the comparative example illustrated in FIG. 23.

DETAILED DESCRIPTION

In the following, some embodiments of the technology will be described in detail with reference to the accompanying drawings.

First Embodiment (Exemplary Overall Configuration)

Figure 2:
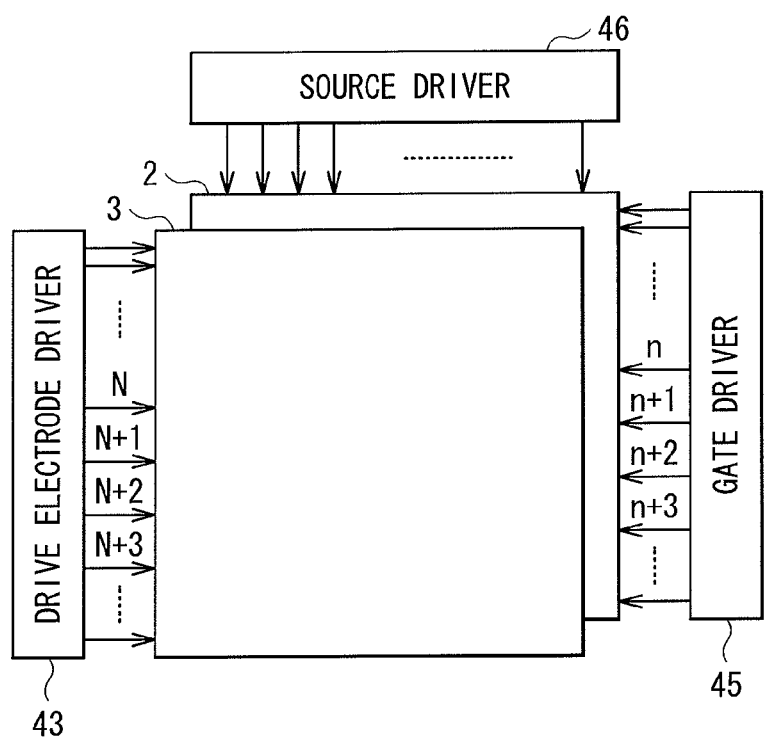
FIG. 2 is a block diagram illustrating an exemplary configuration of a drive circuit in the display device illustrated in FIG. 1.

FIG. 1 illustrates an exemplary cross-sectional configuration of a relevant part of a display device according to a first embodiment of the technology. FIG. 2 illustrates an exemplary configuration of a drive circuit of the display device according to the first embodiment. Referring to FIG. 1, the display device is provided with a pixel substrate 2, an opposed substrate 3 disposed to face the pixel substrate 2, and a liquid crystal layer 6 inserted between the pixel substrate 2 and the opposed substrate 3. The display device is further provided with a drive electrode driver 43, a gate driver 45, and a source driver 46 as illustrated in FIG. 2.

The pixel substrate 2 includes a TFT (Thin-Film Transistor) substrate 21 serving as a circuit board, and a plurality of pixel electrodes 22 disposed in matrix in a first direction (a horizontal direction) and a second direction (a perpendicular direction) on the TFT substrate 21. Although not illustrated, the TFT substrate 21 is formed with TFTs for respective pixels, and wirings such as source lines (image signal wirings) for supplying an image signal to the respective pixel electrodes 22, gate lines for driving the respective TFTs, and drive signal wirings for supplying a drive signal to the later-described drive electrodes 33.

The opposed substrate 3 includes a glass substrate 31, a color filter 32 formed on a first surface of the glass substrate 31, and the drive electrodes (common electrodes) 33 formed on the color filter 32. A second surface of the glass substrate 31 is provided with a polarizing plate 35. The color filter 32 has a configuration in which, for example, color filter layers of three colors of red (R), green (G), and blue (B) are periodically aligned. Here, a set of three colors of R, G and B is assigned to each display pixel, although the number of colors and the types of colors are not limited thereto. The drive electrode 33 is coupled to the TFT substrate 21 by a contact conductive pillar 7. A drive signal Vcom which may have an AC rectangular waveform is applied from the TFT substrate 21 through the contact conductive pillar 7 to the drive electrode 33. The drive signal Vcom, together with a pixel voltage applied to the pixel electrodes 22, defines a display voltage of each of the pixels, and may also be referred to as a common drive signal.

The source driver 46 supplies the image signal to each of the pixel electrodes 22 through unillustrated the source lines. The gate driver 45 applies a scan signal to the pixel electrodes 22, one pixel line (one horizontal pixel line) in the first direction at a time through the unillustrated gate lines. The drive electrode driver 43 applies the drive signal Vcom to the drive electrodes 33, in synchronization with a timing of application of the scan signal by the gate driver 45. A relationship between the timing of application of the scan signal by the gate driver 45 and a timing of application of the drive signal Vcom by the drive electrode driver 43 will be described later in detail.

The liquid crystal layer 6 modulates light passing therethrough in response to a state of an electric field. The liquid crystal layer 6 is a liquid crystal layer of a vertical alignment (VA) mode. FIGS. 7A and 7B illustrate a configuration of the liquid crystal layer 6 of the VA mode, in which FIG. 7A illustrates orientation states of liquid crystal molecules 61 in a state when there is no potential difference between the pixel electrodes 22 and the drive electrodes 33, which corresponds to a state of black displaying. FIG. 7B illustrates the orientation states of the liquid crystal molecules 61 in a state when there is a potential difference between the pixel electrodes 22 and the drive electrodes 33, which corresponds to a state of white displaying or an intermediate state (halftone displaying). FIG. 8 illustrates a state of an electric field (lines of electric force) E in the state in FIG. 7B where the voltage is applied.

It is to be noted that FIGS. 7A and 7B illustrate an example of a VA mode of a two-domain orientation. The two-domain orientation VA mode has a configuration in which one pixel (a single pixel) or one sub-pixel (a single sub-pixel) is divided into two regions, and so operates that the orientation states of the liquid crystal molecules 61 differ from each other between the two regions as illustrated in FIGS. 7B and 8.

Alignment films are respectively disposed between the liquid crystal layer 6 and the pixel substrate 2 and between the liquid crystal layer 6 and the opposed substrate 3, and a light-incident side polarizing plate is disposed below the pixel substrate 2, illustrations of which are omitted in the drawings.

FIG. 6 is a perspective view illustrating an exemplary configuration of the drive electrodes 33 in the opposed substrate 3. Each of the drive electrodes 33 is a strip-like electrode that extends in the first direction (the horizontal direction), and is arranged in a side-by-side fashion in the second direction (the perpendicular direction). Each of the drive electrodes 33 is sequentially supplied with the drive signal Vcom by the drive electrode driver 43, and is thus driven based on sequential scanning performed in a time-divisional fashion.

(Detailed Exemplary Configuration of Drive Electrode 33)

Figure 3:
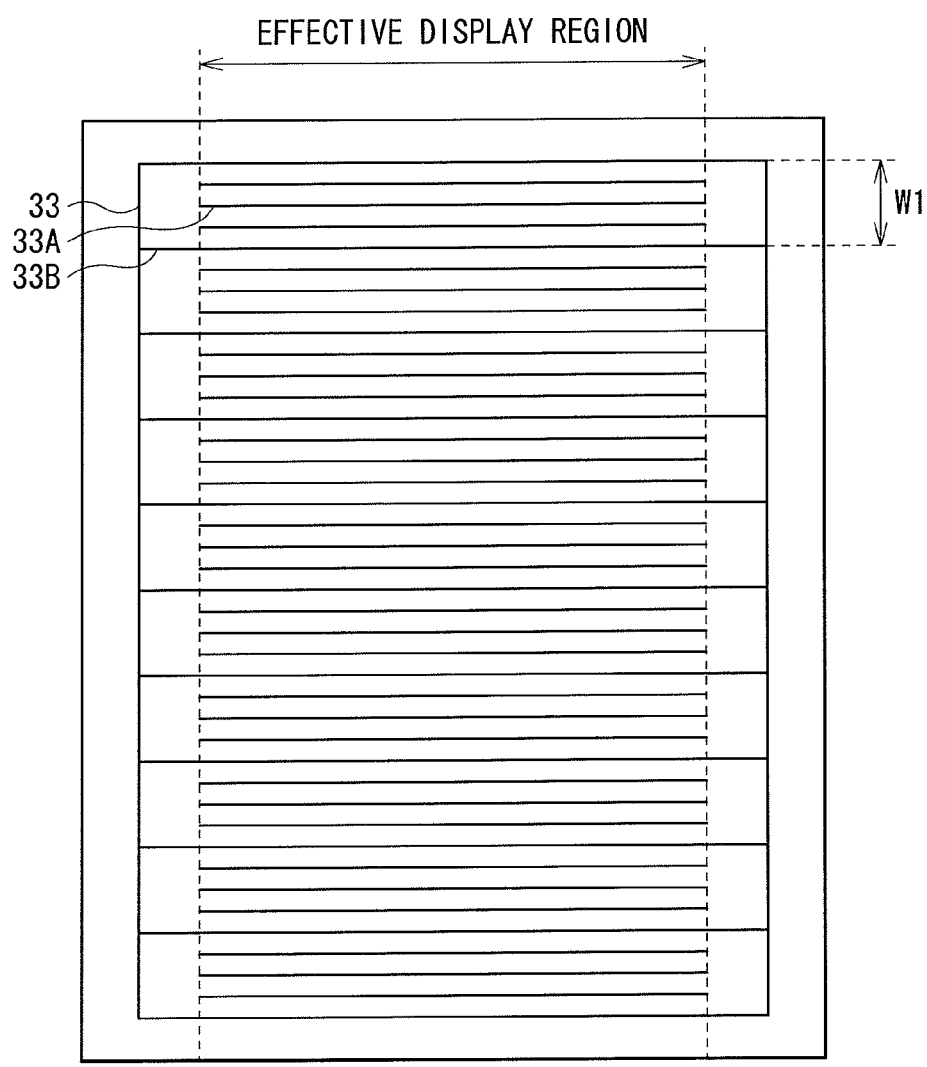
FIG. 3 is a plan view illustrating an exemplary configuration of drive electrodes in the display device illustrated in FIG. 1.

FIGS. 3 and 5 each illustrate a detailed exemplary configuration of the plurality of drive electrodes 33. Note that FIG. 5 is equivalent to illustration in which FIG. 3 is partially enlarged, although a ratio in FIG. 5 of a length in the horizontal direction and a length in the perpendicular direction is changed as compared with that of FIG. 3 for the purpose of easier understanding of an electrode configuration. Also, in FIG. 5, a size of the pixel electrode 22 is equivalent to a size of a single pixel or a single sub-pixel. A width W1 of the single drive electrode 33 has a size corresponding to two or more pixel electrodes 22 (four pixel electrodes 22 in FIG. 5) in the second direction (the perpendicular direction). Each of the drive electrodes 33 has an inner-electrode slit 33A so provided as to extend continuously in the first direction (the horizontal direction). An inter-electrode slit 33B that corresponds to the inner-electrode slit 33A is formed between the adjacent two drive electrodes 33. Each of the drive electrodes 33 has a length which is larger than that of an effective display region in the first direction. The inner-electrode slit 33A is provided at least within the effective display region as illustrated in FIG. 3.

Each of the drive electrodes 33 is connected to the drive signal wiring formed on the TFT substrate 21 through the contact conductive pillar 7. FIG. 4 illustrates an exemplified connection structure utilizing the contact conductive pillar 7 (a contact portion). The contact conductive pillar 7 is provided outside of the effective display region. Part (A) of FIG. 4 illustrates an example where the contact conductive pillars 7 are provided at positions that are further outside of the inner-electrode slits 33A provided in the effective display region and that are on both sides of the respective drive electrodes 33. As illustrated in part (B) of FIG. 4, the contact conductive pillar 7 has a pillar portion 7A, and a conductive film 7B that covers the pillar portion 7A. Alternatively, a configuration may be employed where the conduction is accomplished by using an anisotropic conductive film (ACF), instead of the configuration utilizing the contact conductive pillar 7 illustrated in part (B) of FIG. 4. The anisotropic conductive film is a film that may be obtained by mixing a thermosetting resin with fine metallic particles and forming a thus-obtained resultant into a film. When the anisotropic conductive film is sandwiched between two component parts and is pressurized while applying a heat, the metallic particles dispersed in the film contact one another and thus form a conductive path. The metallic particles may be mixed in a given amount in a sealant used to adhere two glass substrates, to thereby allow conduction to be established only in a vertical direction without establishing the conduction in a lateral direction. This method is extremely efficient in that the conduction can be established in the vertical direction without increasing the number of process steps.

Each of the drive electrodes 33 has one or more inner-electrode slits 33A. FIGS. 3 and 5 each illustrate an example where each of the drive electrodes 33 includes three inner-electrode slits 33A, although it is not limited thereto. A spacing in the second direction between the adjacent inner-electrode slits 33A (when the drive electrode 33 has two or more inner-electrode slits 33A), and a spacing in the second direction between the inner-electrode slit 33A and the inter-electrode slit 33B that are adjacent to each other, are each set to have a size corresponding to the single pixel electrode 22. Also, as illustrated in FIG. 5, the inner-electrode slit 33A and the inter-electrode slit 33B are each so configured as to be located in the center of the pixel electrodes 22, for the plurality of drive electrodes 33. In other words, the inner-electrode slit 33A or the inter-electrode slit 33B is located in the center of each of the pixel electrodes 22, for each one pixel line (each one horizontal pixel line) in the first direction. Namely, each of the inner-electrode slit 33A and the inter-electrode slit 33B extends to pass through center regions of the pixel electrodes 22 which belong to a pixel line in the first direction.

Referring now to FIGS. 9 and 10, a specific design example of the drive electrode 33 will be described. FIG. 9 illustrates a human luminosity factor (a spatial frequency characteristic). When a size such as a width of the inner-electrode slit 33A and the inter-electrode slit 33B is increased excessively, orientation states of liquid crystal molecules are varied greatly between a portion which is between the pixels and a central portion of the pixel due to an influence of a lateral electric field to cause a defect. When this becomes prominent, a leakage of light occurs from a portion having the defect at the time of black displaying, reducing a contrast significantly. A width W2 of the inner-electrode slit 33A and a width W3 of the inter-electrode slit 33B each may be set based on a typical width between pixels such as about 10 micrometers or less, for example, although it is preferable that they be each smaller than the width between the pixels in one embodiment. Further, in one embodiment, the following design example is preferable with respect to each element when taking the human luminosity factor into consideration, where a slit spacing (a slit pitch) W4 is a spacing between the inner-electrode slit 33A and the inter-electrode slit 33B that are adjacent to each other.

Width W1 of drive electrode 33: about 2 mm to 10 mm (preferably 3 mm to 7 mm)

Width W2 of the inner-electrode slit 33A: 10 micrometers or less (preferably 3 mm to 6 mm)

Width W3 of the inter-electrode slit 33B: 10 micrometers or less (preferably 3 mm to 6 mm)

Slit spacing (slit pitch) W4: 500 micrometers or less (integral multiple of pixel pitch)

FIG. 12 describes a result of measurement on recognition of the streak-like (slit-like) display defect when the slit pitch of the drive electrode 33 was varied in the display device according to the first embodiment. FIG. 11 describes a measurement environment thereof. The measurement was performed as illustrated in FIG. 11 for a typical visual environment of the display device, with a surface luminance of 300 cd/m² and a distance of about 20 centimeters away from the display device, for example. Referring to FIG. 12, the streak-like display defect was observed when the slit pitch W4 was 600 micrometers or more. The display defect was hardly observed in a streak-like fashion when the slit pitch W4 was 500 and 400 micrometers, but was observed in the distance of 20 centimeters or less. No streak-like display defect was observed at all when the slit pitch W4 was 300 micrometers or less.

Therefore, it is preferable that the slit pitch W4 be 500 micrometers or less, and more preferably be 300 micrometers or less.

(Exemplary Operation of Drive Control)

In the display device according to the first embodiment, the source driver 46 illustrated in FIG. 2 supplies each of the pixel electrodes 22 with the image signal. The gate driver 45 supplies each of the pixel electrodes 22 with the scan signal (gate signal) used for selecting a horizontal pixel line subjected to displaying. The drive electrode driver 43 applies the drive signal Vcom to each of the drive electrodes 33. The displaying of an image is performed by a combination of those signals.

Each of the drive electrodes 33 corresponds to a plurality of horizontal pixel lines in the display device according to the first embodiment. Thus, the single drive electrode 33 drives collectively the plurality of horizontal pixel lines. On the other hand, the gate driver 45 applies the scan signal, one horizontal pixel line at a time. Hence, a displaying operation performed on a one horizontal pixel line basis is carried out for the displaying operation according to the first embodiment.

As one example, description will be given on signal-application timings of the drive signal Vcom and the scan signal when the drive electrodes 33 and the pixel electrodes 22 have a configuration illustrated in FIG. 13. FIG. 13 illustrates the example where the five inner-electrode slits 33A are provided in the single drive electrode 33. Also, the inter-electrode slit 33B is formed between the N-th drive electrode 33 and the (N+1) th drive electrode 33. The horizontal pixel lines corresponding to the first to the fifth inner-electrode slits 33A from the top in the N-th drive electrode 33 are defined as n-th to (n+4) th horizontal pixel lines, respectively. Further, the horizontal pixel line corresponding to the inter-electrode slit 33B between the N-th drive electrode 33 and the (N+1) th drive electrode 33 is defined as (n+5) th horizontal pixel line. The gate drive 45 sequentially applies the scan signal in an order of n-th horizontal pixel line, (n+1) th horizontal pixel line, (n+2) th horizontal pixel line, and so on.

Referring to FIG. 14, (A) and (B) illustrate examples of timings of the drive signals Vcom applied to the N-th drive electrode 33 and the (N+1) th drive electrode 33 illustrated in FIG. 13, respectively. In FIG. 14, (C) to (E) illustrate examples of timings of the scan signals applied to the n-th horizontal pixel line, the (n+1) th horizontal pixel line, and the (n+5) th horizontal pixel line, respectively.

In the display device according to the first embodiment, when the scan signal is to be applied to a pixel line in a region which does not correspond to the inter-electrode slit 33B (i.e., when the scan signal is to be applied to the pixel line corresponding to the inner-electrode slit 33A), the drive signal Vcom may be applied only to the single drive electrode 33 that corresponds to a pixel line to which the scan signal is to be applied. In the illustrated example of FIG. 13, the drive signal Vcom is only applied to the N-th drive electrode 33 when the scan signal is to be applied to the n-th horizontal pixel line to the (n+4) th horizontal pixel line as illustrated in (A), (C), and (D) of FIG. 14. On the other hand, when the scan signal is to be applied to the pixel line located in the region corresponding to the inter-electrode slit 33B, the drive signals Vcom are applied (for example, simultaneously) to both of the two (a couple of the) drive electrodes 33 that are adjacent to that inter-electrode slit 33B. In the illustrated example of FIG. 13, the drive signals Vcom are applied (for example, simultaneously) to both of the N-th drive electrode 33 and the (N+1) th drive electrode 33 when the scan signal is to be applied to the (n+5) th horizontal pixel line as illustrated in (A), (B), and (E) of FIG. 14.

(Effect)

According to the display device as described in the foregoing, each of the drive electrodes 33 has the one or more inner-electrode slits 33A extending in the first direction at least within the effective display region, and the inter-electrode slit 33B corresponding to the inner-electrode slit 33A is formed between the two adjacent drive electrodes 33. This makes it possible to reduce a structural difference between a portion where the drive electrode 33 is formed and a portion between the two adjacent drive electrodes 33. Thus, it is possible to uniformize the states of orientation of the liquid crystal molecules 61 throughout the entire display region when the display device is applied to a liquid crystal display of the VA mode. Hence, it is possible to suppress deterioration in display quality in the VA mode liquid crystal display. Also, each of the inner-electrode slit 33A and the inter-electrode slit 33B extends to pass through the center regions of the pixel electrodes 22. Hence, it is possible to perform an efficient orientation control suitable for the VA mode liquid crystal display, as compared with an example where a slit is disposed between the adjacent pixel electrodes 22.

A reference is now made to a configuration according to a comparative example illustrated in FIGS. 23 to 24B. As illustrated in FIG. 23, the comparative example has a configuration in which the inner-electrode slit 33A and the inter-electrode slit 33B are each located between the adjacent two pixel electrodes 22. FIGS. 24A and 24B illustrate orientation states of the liquid crystal molecules 61, when the liquid crystal layer 6 is driven based on the two-domain orientation VA mode and when the electrode configuration illustrated in FIG. 23 is employed. FIG. 24A illustrates the orientation states of the liquid crystal molecules 61 in a state when there is no potential difference between the pixel electrodes 22 and the drive electrodes 33, which corresponds to a state of black displaying. FIG. 24B illustrates the orientation states of the liquid crystal molecules 61 in a state when there is a potential difference between the pixel electrodes 22 and the drive electrodes 33, which corresponds to a state of white displaying or an intermediate state (halftone displaying). FIG. 24B also illustrates a state of an electric field (lines of electric force) E in the state where the voltage is applied. The configuration illustrated in FIG. 23 establishes a structure where a position of a slit of the pixel electrode 22 and that of the drive electrode 33 are symmetric vertically with respect to each other as illustrated in FIGS. 24A and 24B. Thus, orientations of the liquid crystal molecules 61 are not defined at the time of the voltage application as illustrated in FIG. 24B, causing disadvantages such as an orientation defect and decrease in response speed. In contrast, the first embodiment has the configuration in which the inner-electrode slit 33A and the inter-electrode slit 33B are each located in the center of the pixel electrodes 22, i.e., each of the inner-electrode slit 33A and the inter-electrode slit 33B extends to pass through the center regions of the pixel electrodes 22. Hence, the first embodiment makes it possible to prevent the disadvantages such as the orientation defect, and to efficiently operate or orient the liquid crystal molecules 61.

Second Embodiment

Hereinafter, a display device according to a second embodiment of the technology will be described. Note that the same or equivalent elements as those of the display device according to the first embodiment described above are denoted with the same reference numerals, and will not be described in detail.

FIG. 15 illustrates a configuration of the drive electrodes 33 in the display device according to the second embodiment. The second embodiment has a configuration in which the inner-electrode slit 33A is not provided, and the inter-electrode slits 33B are each located in the center of the pixel electrodes 22 for each one pixel line in the first direction (the horizontal direction), i.e., the inter-electrode slit 33B extends to pass through a center region of each of the pixel electrodes 22. A width in the second direction (the perpendicular direction) of each of the drive electrodes 33 has a size corresponding to a width in the second direction of the single pixel electrode 22.

As one example, description will be given on the signal-application timings of the drive signal Vcom and the scan signal when the drive electrodes 33 and the pixel electrodes 22 have the configuration illustrated in FIG. 15. In the illustrated example of FIG. 15, the horizontal pixel line corresponding to the inter-electrode slit 33B between the N-th drive electrode 33 and the (N+1) th drive electrode 33 is defined as n-th horizontal pixel line, and the subsequent horizontal pixel line corresponding to the inter-electrode slit 33B between the (N+1) th drive electrode 33 and the (N+2) th drive electrode 33 is defined as (n+1) th horizontal pixel line. The gate driver 45 sequentially applies the scan signal in an order of n-th horizontal pixel line, (n+1) th horizontal pixel line, (n+2) th horizontal pixel line, and so on.

Referring to FIG. 16, (A), (B), and (C) illustrate the examples of timings of the drive signals Vcom applied to the N-th drive electrode 33, the (N+1) th drive electrode 33, and the (N+2) th drive electrode 33 illustrated in FIG. 15, respectively. In FIG. 16, (D) and (E) illustrate the examples of timings of the scan signals applied to the n-th horizontal pixel line and the (n+1) th horizontal pixel line, respectively.

In the display device according to the second embodiment, when the scan signal is to be applied from the gate driver 45 to a pixel line located in a region corresponding to the single inter-electrode slit 33B, the drive electrode driver 43 illustrated in FIG. 2 applies the drive signals Vcom (for example, simultaneously) to both of the two (a couple of the) drive electrodes 33 that are adjacent to that single inter-electrode slit 33B. In the illustrated example of FIG. 15, the drive signals Vcom are applied (for example, simultaneously) to both of the N-th drive electrode 33 and the (N+1) th drive electrode 33 when the scan signal is to be applied to the n-th horizontal pixel line, as illustrated in (A), (B), and (D) of FIG. 16. Likewise, the drive signals Vcom are applied (for example, simultaneously) to both of the (N+1) th drive electrode 33 and the (N+2) th drive electrode 33 when the scan signal is to be applied to the (n+1) th horizontal pixel line, as illustrated in (B), (C), and (E) of FIG. 16.

Third Embodiment

Hereinafter, a display device according to a third embodiment of the technology will be described. Note that the same or equivalent elements as those of the display device according to the first embodiment or the second embodiment described above are denoted with the same reference numerals, and will not be described in detail.

The display device according to the third embodiment differs partially from the configuration of the drive electrodes 33 illustrated in FIG. 5 of the display device according to the first embodiment described above, in terms of a configuration (a slit shape) of the inner-electrode slit 33A. FIG. 17 illustrates a configuration of the drive electrodes 33 according to the third embodiment. In the above-described first embodiment, the inner-electrode slits 33A are provided continuously to extend in the first direction (the horizontal direction). In contrast, in this embodiment, the inner-electrode slits 33A are not continuous in the first direction, and discontinuous regions 33C are partially formed to provide slits in an intermittent fashion as illustrated in FIG. 17. The discontinuous region 33C is formed at a position between the pixel electrodes 22 in the first direction, i.e., each of the inner-electrode slits 33A is configured to be discontinuous in a region between the pixel electrodes 22 in the first direction. The provision of the discontinuous region 33C makes it possible to lower a resistance of the drive electrode 33 than the case where the continuous inner-electrode slit 33A is provided.

Fourth Embodiment

Hereinafter, a display device according to a fourth embodiment of the technology will be described. Note that the same or equivalent elements as those of the display devices according to the first to the third embodiments described above are denoted with the same reference numerals, and will not be described in detail.

The first embodiment described above employs the two-domain orientation VA mode, whereas the fourth embodiment employs a VA mode of a four-domain orientation. The four-domain orientation VA mode has a configuration in which a single pixel or a single sub-pixel is divided into four regions, and so operates that the orientation states of the liquid crystal molecules 61 differ from one another among the four regions.

FIG. 18 schematically illustrates a configuration of the pixel electrodes 22 and a configuration of the drive electrodes 33 according to the fourth embodiment. FIG. 19 illustrates a detailed configuration thereof, and FIG. 20 illustrates a part of the configuration illustrated in FIG. 19 in an enlarged fashion. FIGS. 19 and 20 illustrate only a configuration of a slit portion (the inner-electrode slit 33A and the inter-electrode slit 33B) for the configuration of the drive electrodes 33. Also, the configuration is illustrated in FIGS. 19 and 20 where each of the pixel electrodes 22 is provided in a sub-pixel unit.

In the fourth embodiment, the inner-electrode slit 33A is provided not only in the first direction (the horizontal direction) but also in the second direction (the perpendicular direction) in a central part of the pixel electrode 22 as illustrated in FIGS. 18 to 20. Thus, the inner-electrode slit 33A is in a cross-like shape in the central part of the single pixel electrode 22 (the sub-pixel). The configuration according to the fourth embodiment described above makes it possible to efficiently operate or orient the liquid crystal molecules 61 in four domains.

Fifth Embodiment

Hereinafter, a display device according to a fifth embodiment of the technology will be described. Note that the same or equivalent elements as those of the display devices according to the first to the fourth embodiments described above are denoted with the same reference numerals, and will not be described in detail.

The fifth embodiment employs the four-domain orientation VA mode as in the fourth embodiment described above.

FIG. 21 illustrates a configuration of the pixel electrodes 22 and a configuration of the drive electrodes 33 according to the fifth embodiment. FIG. 21 illustrates a detailed configuration thereof, and FIG. 22 illustrates a part of the configuration illustrated in FIG. 21 in an enlarged fashion. FIGS. 21 and 22 illustrate only a configuration of a slit portion (the inner-electrode slit 33A and the inter-electrode slit 33B) for the configuration of the drive electrodes 33. Also, the configuration is illustrated in FIGS. 21 and 22 where each of the pixel electrodes 22 is provided in a sub-pixel unit.

In the fifth embodiment, the inner-electrode slit 33A is provided not only in the first direction (the horizontal direction) but also in the second direction (the perpendicular direction) in the central part of the pixel electrode 22, as in the fourth embodiment described above with reference to FIGS. 19 and 20. Thus, the inner-electrode slit 33A is in the cross-like shape in the central part of the single pixel electrode 22 (the sub-pixel). The configuration according to the fifth embodiment described above makes it possible to efficiently operate or orient the liquid crystal molecules 61 in four domains.

Further, in the fifth embodiment, fine pixel electrode slits 22B are provided in the pixel electrode 22 as illustrated in FIG. 22. The provision of the fine pixel electrode slits 22B makes it possible to perform an orientation control of the liquid crystal molecules 61 in desired orientations more accurately.

The present disclosure contains subject matter related to that disclosed in Japanese Priority Patent Application JP 2010-187176 filed in the Japan Patent Office on Aug. 24, 2010, the entire content of which is hereby incorporated by reference.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in this disclosure is intended to be dedicated to the public regardless of whether the element or component is explicitly recited in the following claims.

What is claimed is:

1. A display device, comprising:
a plurality of drive electrodes extending, in a first direction, with a length larger than that of an effective display region, and arranged side-by-side in a second direction with an inter-electrode slit in between, each of the drive electrodes being supplied with a drive signal;
a plurality of pixel electrodes arranged in a matrix in the first and second directions to face the drive electrodes, each of the pixel electrodes being supplied with an image signal;
a gate driver allowing pixel electrodes in a pixel line in the first direction to be supplied with a scan signal; and
a drive electrode driver allowing the drive electrodes to be supplied with the drive signal,
wherein,
the inter-electrode slit extends to pass over a center region of each of the pixel electrodes,
each of the drive electrodes has a width in the second direction corresponding to a size in the second direction of two or more pixel electrodes, and has one or more inner-electrode slits extending in the first direction at least within the effective display region,
each of the inner-electrode slit and the inter-electrode slit extends to pass over center regions of the pixel electrodes that belong to the pixel line in the first direction,
when the scan signal from the gate driver is to be applied to a first pixel line located in a region corresponding to the inter-electrode slit, the drive electrode driver applies the drive signal to both of a couple of drive electrodes that are adjacent to each other with the inter-electrode slit in between, and
when the scan signal is to be applied to a second pixel line located in a region other than a region corresponding to the inter-electrode slit, the drive electrode driver applies the drive signal to a single drive electrode corresponding to the second pixel line.

2. The display device according to claim 1, wherein each of the inner-electrode slits is configured to be discontinuous in a region between the pixel electrodes in the first direction.

3. The display device according to claim 1, wherein a second inner-electrode slit is provided, in the center of each of the pixel electrodes, to extend in the second direction.

4. The display device according to claim 1, wherein each of the drive electrodes has a width in the second direction corresponding to a size in the second direction of each of the pixel electrodes, and the inner-electrode slit extends to pass over a center region of each of the pixel electrodes that belong to the pixel line in the first direction.

5. The display device according to claim 1, further comprising:
a pixel substrate having the pixel electrodes, an image signal wiring, and a drive signal wiring, the image signal wiring supplying the pixel electrodes with the image signal, and the drive signal wiring supplying the drive electrodes with the drive signal;
an opposed substrate disposed to face the pixel substrate and having the drive electrodes; and
a contact portion provided at a location that is between the pixel substrate and the opposed substrate and outside of the effective display region, the contact portion allowing each drive electrode to be in conduction with the drive signal wiring.

6. The display device according to claim 1, wherein:
each of the drive electrodes has two or more inner-electrode slits, and one or both of a first spacing and a second spacing have dimensions of about 500 micrometers or less, the first spacing representing a distance in the second direction between the adjacent inner-electrode slits, and the second spacing representing a distance in the second direction between the inner-electrode slit and the inter-electrode slit that are adjacent to each other.

7. The display device according to claim 6, wherein one or both of the first spacing and the second spacing have dimensions of about 300 micrometers or less.

8. The display device according to claim 1, further comprising a liquid crystal layer of a vertical alignment mode disposed between the drive electrodes and the pixel electrodes.

9. A display device, comprising:
a plurality of drive electrodes extending, in a first direction, with a length larger than that of an effective display region, and arranged side-by-side in a second direction with an inter-electrode slit in between, each of the drive electrodes being supplied with a drive signal;
a plurality of pixel electrodes arranged in a matrix in the first and second directions to face the drive electrodes, each of the pixel electrodes being supplied with an image signal;
a gate driver allowing pixel electrodes in a pixel line in the first direction to be supplied with a scan signal; and
a drive electrode driver allowing the drive electrodes to be supplied with the drive signal,
wherein,
the inter-electrode slit extends to pass over a center region of each of the pixel electrodes,
each of the drive electrodes has a width in the second direction corresponding to a size in the second direction of each of the pixel electrodes, and the inner-electrode slit extends to pass over a center region of each of the pixel electrodes that belong to the pixel line in the first direction, and
when the scan signal from the gate driver is to be applied to a pixel line located in a region corresponding to the inter-electrode slit, the drive electrode driver applies the drive signal to both of a couple of drive electrodes that are adjacent to that inter-electrode slit.

10. A display device, comprising:
a plurality of drive electrodes extending, in a first direction, with a length larger than that of an effective display region, and arranged side-by-side in a second direction with an inter-electrode slit in between, each of the drive electrodes being supplied with a drive signal; and
a plurality of pixel electrodes arranged in a matrix in the first and second directions to face the drive electrodes, each of the pixel electrodes being supplied with an image signal,
wherein,
the inter-electrode slit extends to pass over a center region of each of the pixel electrodes,
each of the drive electrodes has a width in the second direction corresponding to a size in the second direction of two or more pixel electrodes, and has two or more inner-electrode slits extending in the first direction at least within the effective display region,
each of the inner-electrode slit and the inter-electrode slit extends to pass over center regions of pixel electrodes that belong to a pixel line in the first direction, and
one or both of a first spacing and a second spacing have dimensions of about 500 micrometers or less, the first spacing representing a distance in the second direction between the adjacent inner-electrode slits, and the second spacing representing a distance in the second direction between the inner-electrode slit and the inter-electrode slit that are adjacent to each other.

11. The display device according to claim 10, wherein one or both of the first spacing and the second spacing have dimensions of about 300 micrometers or less.

12. A display device, comprising:
a plurality of drive electrodes extending in a first direction and arranged side-by-side in a second direction with an inter-electrode slit in between;
a plurality of pixel electrodes arranged in a matrix in the first and second directions;
a gate driver allowing the pixel electrodes to be supplied with a scan signal; and
a drive electrode driver allowing the drive electrodes to be supplied with a drive signal,
wherein,
each of the drive electrodes has one or more inner-electrode slits,
a center of each pixel electrode is located in the inter-electrode slit or in the inner-electrode slit, and
when the scan signal from the gate driver is to be applied to a pixel line located in a region corresponding to the inter-electrode slit, the drive electrode driver applies the drive signal to both of a couple of drive electrodes that are adjacent to that inter-electrode slit.

* * * * *